(12) United States Patent
Ooba

(10) Patent No.: US 9,917,980 B2
(45) Date of Patent: Mar. 13, 2018

(54) PRINT CONTROL APPARATUS FOR INQUIRING WHETHER A USER WANTS TO CHANGE A BINDING PROCESS, CONTROL METHOD, AND STORAGE MEDIUM

(71) Applicant: CANON KABUSHIKI KAISHA, Tokyo (JP)

(72) Inventor: Hideaki Ooba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/956,120

(22) Filed: Dec. 1, 2015

(65) Prior Publication Data
US 2016/0165091 A1 Jun. 9, 2016

(30) Foreign Application Priority Data
Dec. 4, 2014 (JP) ................................. 2014-246329

(51) Int. Cl.
*G06F 3/12* (2006.01)
*H04N 1/32* (2006.01)
*H04N 1/00* (2006.01)

(52) U.S. Cl.
CPC ....... *H04N 1/32561* (2013.01); *G06F 3/1204* (2013.01); *G06F 3/1258* (2013.01); *G06F 3/1285* (2013.01); *H04N 1/0032* (2013.01); *H04N 1/00639* (2013.01); *H04N 2201/0094* (2013.01)

(58) Field of Classification Search
CPC .......................... H04N 1/00639; G06F 3/1258
See application file for complete search history.

(56) References Cited

U.S. PATENT DOCUMENTS

| | | | | |
|---|---|---|---|---|
| 2005/0232656 A1* | 10/2005 | Asai | ........................ | B42C 19/02 399/130 |
| 2010/0149565 A1* | 6/2010 | Mori | ...................... | B65H 33/00 358/1.9 |
| 2013/0214470 A1* | 8/2013 | Yokomizo | .............. | B65H 39/10 270/1.01 |
| 2013/0214472 A1* | 8/2013 | Suzuki | ................... | B65H 39/00 270/1.01 |
| 2014/0001693 A1* | 1/2014 | Ishizuka | ................ | B65H 37/04 270/1.01 |
| 2014/0203490 A1* | 7/2014 | Totsuka | .................... | B42B 5/00 270/1.01 |
| 2015/0183255 A1* | 7/2015 | Nakagomi | ................ | B42C 1/12 412/11 |

(Continued)

FOREIGN PATENT DOCUMENTS

JP 3344150 B2 11/2002
JP 2013170067 A 9/2013

*Primary Examiner* — Benjamin O Dulaney
(74) *Attorney, Agent, or Firm* — Canon U.S.A., Inc. IP Division

(57) ABSTRACT

When a user changes a setting of a hold job that includes a stapleless binding process setting, a print control apparatus determines whether the number of sheets to be printed when the setting change is applied is equal to or less than the upper-limit number of sheets that can be bound in the stapleless binding process. The print control apparatus inquires whether the user wants to change the staple setting to a staple binding process or cancel the setting change in a case where it is determined that the number of sheets to be printed is greater than the upper-limit number of sheets.

9 Claims, 19 Drawing Sheets

(56) References Cited

U.S. PATENT DOCUMENTS

2015/0350469 A1* 12/2015 Kanamoto ......... G03G 15/6544
   358/1.15
2016/0096700 A1* 4/2016 Suzuki .................. B65H 37/04
   412/1

* cited by examiner

FIG.8A

FINISHING SETTINGS

<STAPLE>
PLEASE SELECT STAPLE TYPE AND BINDING POSITION.

| STAPLE TYPE | BINDING POSITION |
|---|---|

- STAPLE BINDING PROCESS — 802
- STAPLELESS BINDING PROCESS — 803

804

- UPPER LEFT — 805
- LOWER LEFT — 806
- UPPER RIGHT — 807
- LOWER RIGHT — 808

× CANCEL SETTINGS — 811    812 — OK

FIG.8B

PAGE AGGREGATION SETTINGS

NUMBER OF PAGES TO BE ALLOCATED TO ONE SHEET IS SET.

- 2 in 1 — 820
- 4 in 1 — 821
- 8 in 1 — 822

PAPER SIZE CHANGE ▶ — 823

☐ TWO-SIDED PRINT    ▶ DETAILED SETTINGS

824    × CANCEL SETTINGS — 811   825    812 — OK

PRINT CONTROL APPARATUS FOR INQUIRING WHETHER A USER WANTS TO CHANGE A BINDING PROCESS, CONTROL METHOD, AND STORAGE MEDIUM

BACKGROUND OF THE INVENTION

Field of the Invention

The present invention relates to a print control apparatus that controls a print operation based on a print job that includes a binding processing setting.

Description of the Related Art

As discussed in Japanese Patent Application Laid-Open No. 2013-170067, there is an image forming apparatus that can use a staple binding process for binding a plurality of sheets with a staple or a stapleless binding process for binding a plurality of sheets without using any staple to bind sheets on which images are printed. According to the above-mentioned image forming apparatus, the binding process to be applied to the sheets is determined based on a binding process type designated beforehand in a print job.

In the above-mentioned case, the upper-limit number of sheets for which the binding processing can be performed may be relatively small when sheets are bound without using any staple, compared to the case where sheets are bound with a staple.

Further, as discussed in Japanese Patent No. 3344150, an image forming apparatus having a job holding function is conventionally known. More specifically, the image forming apparatus can successively store print jobs in a hold queue and print a necessary job selected from among the jobs stored in the hold queue (hereinafter, referred to as "hold jobs"). Further, according to the image forming apparatus discussed in Japanese Patent No. 3344150, it is allowed to change various print settings set for a hold job stored in the hold queue, and print processing can be performed based on the changed print settings.

According to the image forming apparatus discussed in Japanese Patent No. 3344150, a user can appropriately change print settings, including imposition setting for a hold job, sheet type settings, and number of printed copies, before the image forming apparatus starts the print processing. However, the number of sheets may change according to a change of the print settings. Further, in a case where the upper-limit number of sheets allowable for the binding processing is differentiated for each sheet type, the upper-limit number of sheets may change according to a change of the print settings.

Even in an image forming apparatus that can use the staple binding process for binding sheets with a staple and the stapleless binding process for binding sheets without using any staple, a user may change the job holding function and the print settings of a hold job.

However, an ordinary user does not memorize the upper-limit number of sheets allowable for each binding processing. Therefore, immediately determining whether to continue the present binding processing after a change of the print settings is difficult for the user. In this case, for example, the user will notice that the binding processing is not performed as set by a user at a time of job transmission, only when the user sees an output product. Further, for example, even in a case where the user memorizes the upper-limit number of sheets allowable for the binding processing, the user is required to perform a cumbersome work for switching the type of the binding processing with reference to the changed number of sheets to be printed after confirming the change of the print settings.

SUMMARY OF THE INVENTION

The present invention is directed to a print control apparatus and a control method capable of easily setting an appropriate type of binding processing according to a setting change of a job being currently held.

According to an aspect of the present invention, a print control apparatus that controls a print operation based on a print job, includes an accepting unit configured to accept a setting change of a print job selected by a user from among stored print jobs, and a control unit configured to, in a case where the print job becomes a print job in which first binding processing for binding sheets without using any staple is set and the number of sheets to be used for the print job exceeds the number of sheets allowable for the first binding processing by reflecting the setting change accepted by the accepting unit, inquire whether a user wants to perform second binding processing for binding sheets with a staple and reflect the setting change of the print job based on a user instruction in response to the inquiry, and in a case where the print job becomes a job in which the first binding processing is set and the number of sheets to be used for the print job does not exceed the number of sheets allowable for the first binding processing by reflecting the setting change accepted by the accepting unit, reflect the setting change of the print job without performing the inquiry.

Further features of the present invention will become apparent from the following description of exemplary embodiments with reference to the attached drawings.

BRIEF DESCRIPTION OF THE DRAWINGS

FIGS. 8A and 8B illustrate operation screens that can be displayed on the panel.

DESCRIPTION OF THE EMBODIMENTS

Hereinafter, exemplary embodiments of the present invention will be described in detail below with reference to attached drawings. The following exemplary embodiments are not intended to limit the present invention according to the scope of claims. Further, the present invention does not always require all of combinations of features described in respective exemplary embodiments as solving means.

Figure 1:
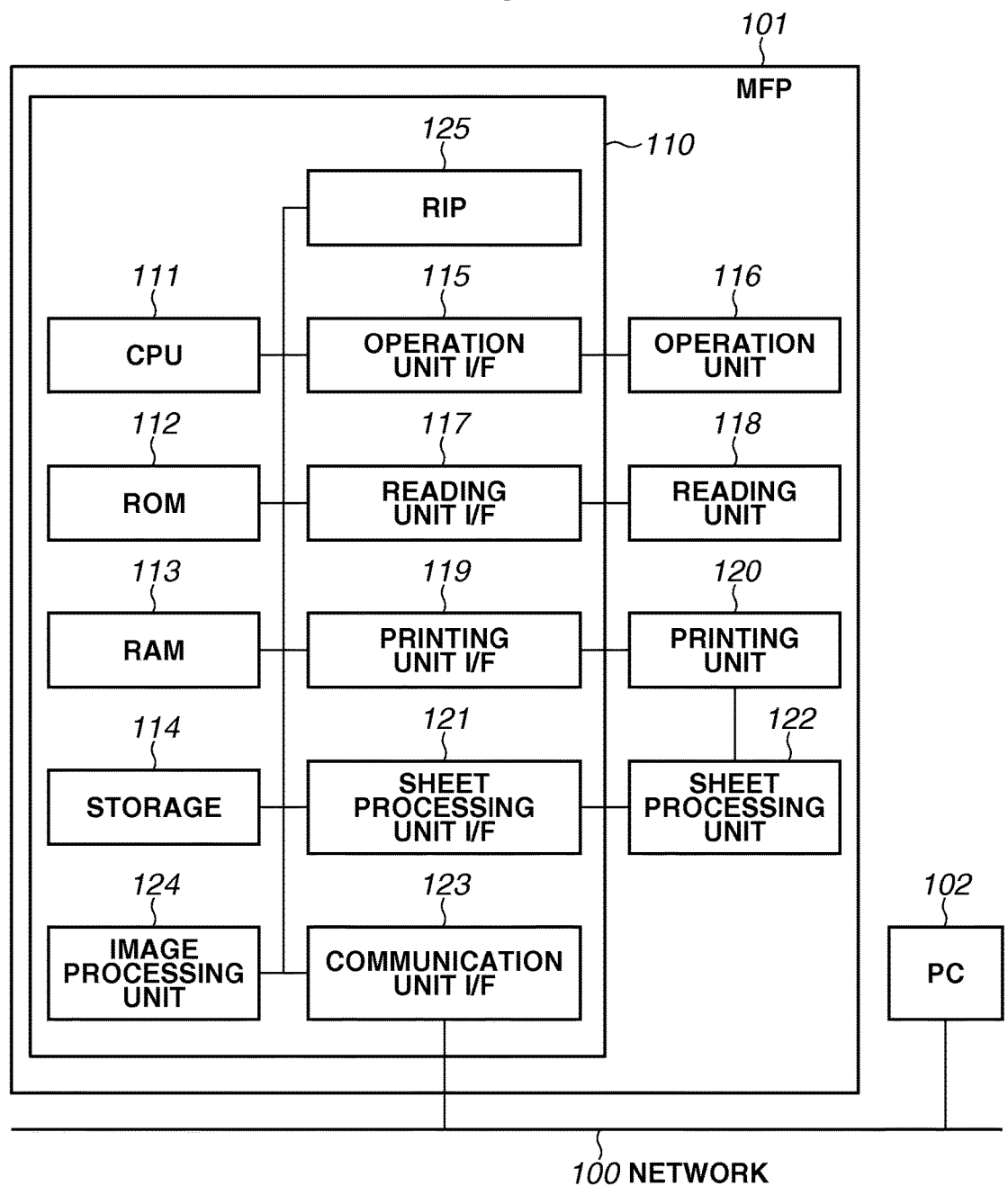
FIG. 1 is a block diagram illustrating a print processing system.

First, a first exemplary embodiment of the present invention will be described. FIG. 1 is a block diagram illustrating a print processing system according to the present exemplary embodiment. In the present exemplary embodiment, a multifunction peripheral (MFP) 101 is an example of an image forming apparatus and a personal computer (PC) 102 is an example of the information processing apparatus. The MFP 101 and the PC 102, which are connected via a network 100, can communicate with each other.

The print processing system illustrated in FIG. 1 includes only one information processing apparatus. However, the print processing system can be configured to connect the MFP 101 with a plurality of information processing apparatuses via the network 100 so that MFP 101 can communicate with each one of the information processing apparatuses.

The print processing system according to the present exemplary embodiment is not limited to the arrangement including the image forming apparatus and the information processing apparatus. For example, the print processing system can be configured to include only the image forming apparatus.

First, the PC 102 will be described in detail below. The PC 102 can execute various programs, including an application program that inputs a print job. Further, a printer driver is installed on the PC 102. The printer driver has a function of converting print data into printer language supported by the MFP 101. A user can input a print instruction through an appropriate application when the user wants to cause the information processing apparatus to perform print processing. When the application generates data, the printer driver can convert the generated data into print data that the MFP 101 can interpret based on the print instruction and can transmit the print data to the MFP 101 connected to the network 100.

In the present exemplary embodiment, the PC 102 is an example of the information processing apparatus. For example, the information processing apparatus according to the present exemplary embodiment can be a portable information terminal, such as a smartphone or a tablet terminal. The method for transmitting the print data to the image forming apparatus can be modified appropriately. For example, the print data can be transmitted to the image forming apparatus via a print dedicated application (or driver). Further, the print data can be transmitted to the image forming apparatus via a cloud server. Further, an appropriate communication method, such as Bluetooth (registered trademark) or Near Field Communication (NFC), is employable to transmit the print data to the image forming apparatus.

Next, the MFP 101 will be described in detail below. The MFP 101 has a reading function of reading an image from a sheet and a print function of printing an image on a sheet. Further, the MFP 101 has a post-processing function of binding a plurality of sheets on which images are printed, aligning a plurality of sheets, and sorting a plurality of sheets to a plurality of trays (discharge destinations). The sheets include plain papers, thick papers, and OHP sheets.

Further, the MFP 101 has a job holding function of storing a print job accepted from an external apparatus (e.g., the PC 102) and image data having been read in a hold queue. The job holding function includes appropriately changing print settings of the job (data) stored in the hold queue and performing printing of the job (data) according to the changed print settings.

In the present exemplary embodiment, the MFP 101 is an example of the image forming apparatus. However, the image forming apparatus according to the present exemplary embodiment may be a printer that does not have the above-mentioned reading function or a single-function image forming apparatus that has only a copy function. In the present exemplary embodiment, the image forming apparatus includes the following various configuration elements.

Further, in the present exemplary embodiment, the MFP 101 includes a print controller provided in the same housing. The print controller can manage each print job. However, the configuration of the MFP 101 is not limited to the above-mentioned example. For example, a print server or any other print control apparatus (not illustrated) may be connected to the MFP 101. In this case, the print control apparatus is configured to perform job setting change processing according to a flowchart described below. For example, the MFP 101 may be connected to an independent sheet processing apparatus that has the post-processing function.

The control unit 110 includes a central processing unit (CPU) 111 that can control various operations to be performed by the MFP 101. The CPU 111 can read control programs from a read only memory (ROM) 112 and a storage 114 and can perform various controls (e.g., a reading control and a printing control). The ROM 112 stores the control programs that can be executed by the CPU 111. Further, the ROM 112 stores boot sequence and font information. A random access memory (RAM) 113 is a main storage memory for the CPU 111. The RAM 113 is usable as a work area and a temporary storage area to load various control programs from the ROM 112 and the storage 114. The storage 114 stores image data, print data, various programs, various kinds of history information, and various kinds of setting information. Further, the storage 114 includes a Print queue as a storage region capable of storing print jobs and a Hold queue as a storage region capable of storing hold jobs.

In the present exemplary embodiment, the storage 114 may be an auxiliary storage apparatus, such as a hard disk drive (HDD) or a flash disk represented by a solid state drive (SSD). In the MFP 101 according to the present exemplary embodiment, it is assumed that only one CPU 111 performs processing of each flowchart described below with one memory (the RAM 113). However, any other configuration is employable. For example, the MFP 101 can be configured to include two or more CPUs, RAMs, ROMs, and storages that can cooperate with each other to perform processing of each flowchart. Further, the MFP 101 can be configured to include a hardware circuit (e.g., application specific integrated circuit (ASIC) or field-programmable gate array (FPGA)) to perform a part of the processing.

Figure 2:
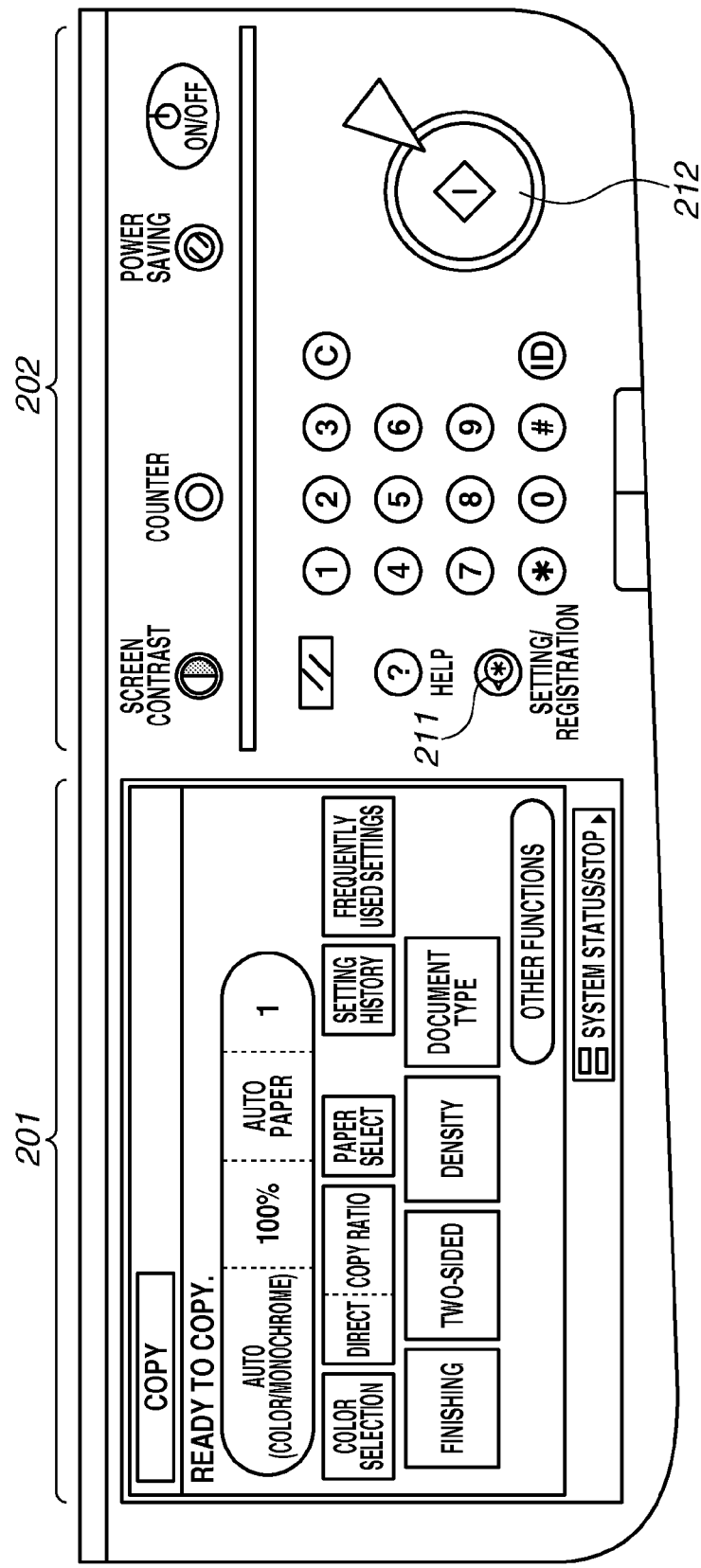
FIG. 2 illustrates an operation unit.

An operation unit I/F 115 connects an operation unit 116 to the control unit 110. The operation unit 116 can display information necessary for a user and can receive instructions input from a user. FIG. 2 illustrates an appearance of the operation unit 116. The operation unit 116 is composed of a panel 201 that can display operation screens described below and a hard key input unit 202. The panel 201 is, for example, a touch panel display unit. The hard key input unit 202 includes a start button 212, a setting button 211, and other various hard keys. Each user can input instructions by touching any key displayed on the panel 201 or pressing various hard keys of the hard key input unit 202. The panel 201 may be a display device that does not have any touch panel function. In this case, the display device may be configured to include a scroll key that is operable to select a displayed key and a determination key that is operable to finalize key input content, as a hard key input unit.

The operation unit 116 can accept a user instruction via the panel 201 or the input unit 202 and can display a necessary operation screen on the panel 201.

A reading unit I/F 117 connects a reading unit 118 and the control unit 110. The reading unit 118 can read an image from a sheet and can convert the image into image data (e.g., binary data). The image data generated by the reading unit 118 can be transferred to an image processing unit 124 via the reading unit I/F 117. The image processing unit 124 can perform image processing (e.g., rotation and compression) on the image data. The image data having been subjected to the image processing can be stored in the storage 114 or the RAM 113 of the control unit 110. The image data can be transmitted to the external apparatus via the communication unit I/F 123 or can be printed on a sheet. Further, the image processing unit 124 can perform compression processing and decompression processing on the image data stored in the RAM 113 and the storage 114 according to an appropriate compression method (e.g., Joint Bi-level Image Experts Group (JBIG) or Joint Photographic Experts Group (JPEG)).

A printing unit I/F 119 connects a printing unit 120 and the control unit 110. Data of an image to be printed (print target image data) can be transferred from the control unit 110 to the printing unit 120 via the printing unit I/F 119. The printing unit 120 receives a control command and the print target image data from the CPU 111, and prints an image on a sheet (e.g., a paper) based on the image data.

A sheet processing unit I/F 121 connects a sheet processing unit 122 and the control unit 110. The sheet processing unit 122 receives a control command from the CPU 111 and performs post-processing on the sheet, on which the image has been printed by the printing unit 120, according to the control command. For example, the post-processing that can be performed by the sheet processing unit 122 includes aligning a plurality of sheets, sorting a plurality of sheets into a plurality of trays (discharge destinations), and saddle stitch binding, punching, or binding a plurality of sheets. Further, post-processing functions and post-processing capabilities of the sheet processing unit can be notified of beforehand (e.g., at the startup timing of the MFP 101) to the control unit 110 via the sheet processing unit I/F 121 and also notified of to the storage 114 or the RAM 113.

In the present exemplary embodiment, the sheet processing unit 122 is capable of performing processing for binding a plurality of sheets with a staple (i.e., staple binding unit) or performing processing for binding a plurality of sheets without using any staple (i.e., stapleless binding unit).

Further, the control unit 110 is connected to the network 100 via the communication unit I/F 123. The communication unit I/F 123 can transmit image data and information to an external apparatus (e.g., a mail server, a file server, or a PC) via the network 100. The communication unit I/F 123 can receive print data and information from an information processing apparatus via the network 100. In FIG. 1, the PC 102 is an example of the information processing apparatus. Further, the communication unit I/F 123 can communicate with an external apparatus via a local interface (e.g., a universal serial bus (USB)). The print data received by the communication unit I/F 123 can be stored in the storage 114.

In the present exemplary embodiment, it is assumed that the MFP 101 includes a plurality of queues that can accept print data. If an input destination queue set for the print data is the Hold queue, the CPU 111 generates a hold job and inputs the generated hold job to the Hold queue of the storage 114 or the RAM 113. If the input destination queue set for the print data is the Print queue or other designation, the CPU 111 generates a print job and inputs the generated print job to the Print queue.

A software module (i.e., a PDL analyzing unit (not illustrated)), which is capable of analyzing the print data stored in the storage 114 or the ROM 112, analyzes the print data received via the communication unit I/F 123. The PDL analyzing unit analyzes print data expressed in various types of page description languages (PDL) stored in the storage 114. The print data includes codes relating to print attribute and codes relating to rendering. The print data includes print attribute information, such as the number of print copies being set for the entire print data or for each page, information relating to binding processing, and output sheet information (e.g., sheet size, sheet type, and paper feeding cassette).

The PDL analyzing unit temporarily stores the print attribute information (i.e., the setting relating to the print attribute obtained by analyzing the print data) in the RAM 113 or the storage 114.

Further, the PDL analyzing unit generates intermediate codes based on the print data. The PDL analyzing unit analyzes rendering codes included in the print data and converts the rendering codes into intermediate codes. Compared to the print data, the intermediate code has a format suitable for the rendering processing (rasterization) and mainly constituted by edge coordinate data and inter-edge paint-out data.

Further, the PDL analyzing unit calculates the number of sheets to be output based on the PDL analysis result and stores the calculated result, as the print attribute information, in the RAM 113 or the storage 114. The print attribute information acquired or calculated by the PDL analyzing unit can be appropriately referred to in print processing to be performed based on print data or in post-processing to be performed by the sheet processing unit 122.

If the print data includes designation of the Hold queue, the CPU 111 generates a hold job that includes the intermediate codes analyzed by the PDL analyzing unit, which are integrated with the print attribute information in one format, and stores the generated hold job in the hold queue. On the other hand, if the print data includes designation of the Print queue or other designation, the CPU 111 generates a print job that includes intermediate data converted into image data by a RIP 125.

Further, the intermediate codes generated by the PDL analyzing unit can be converted into image data by the RIP 125. The RIP 125 performs rendering processing on the intermediate codes generated by the PDL analyzing unit and generates image data to be printed by the printing unit 120. The image data generated by the RIP 125 can be formatted as a print job and input to the Print queue of the storage 114 or the RAM 113 of the control unit 110. Each print job having been input in the Print queue can be printed on a sheet by the printing unit 120.

Figure 3:
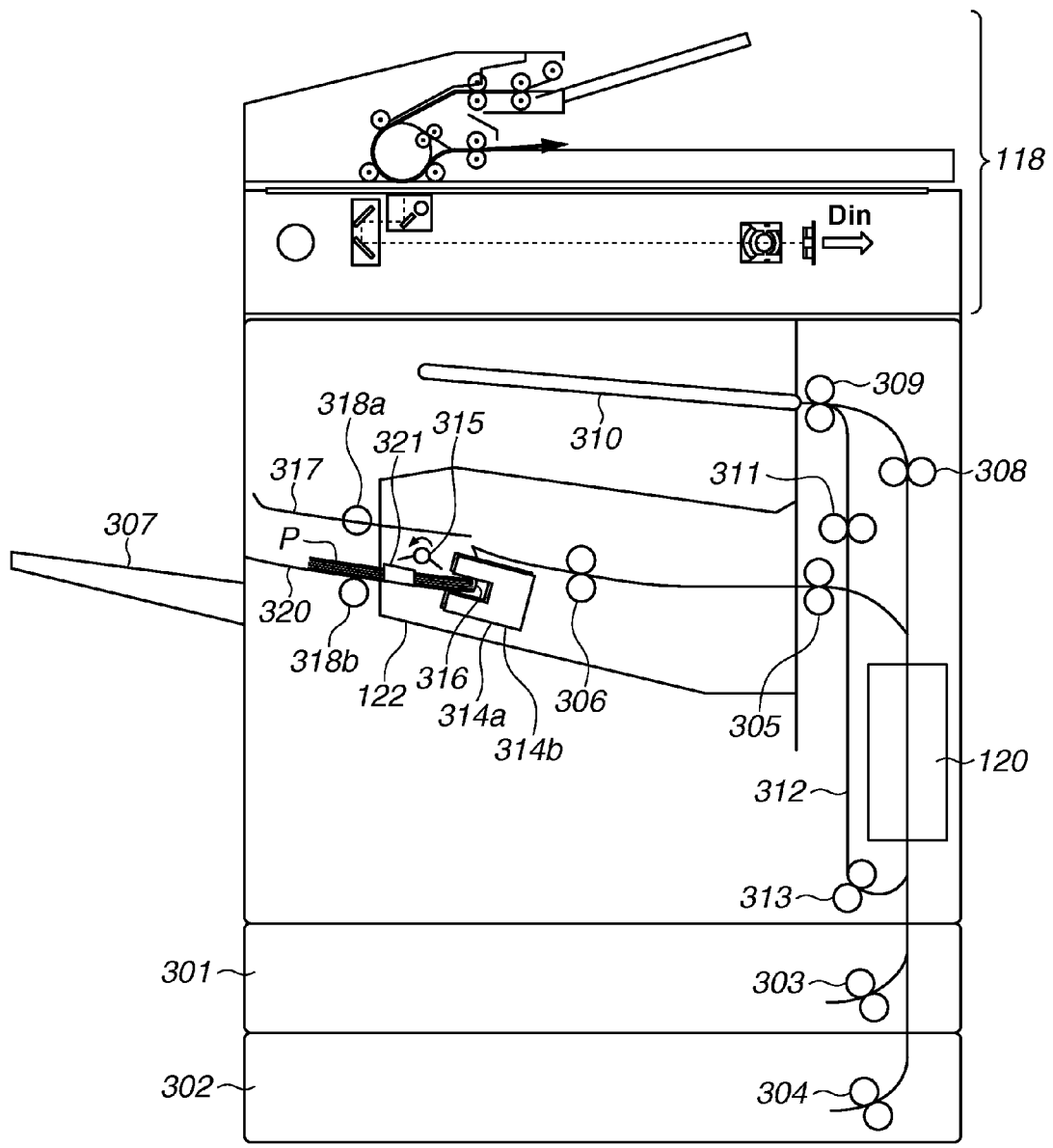
FIG. 3 is a cross-sectional view of a multifunction peripheral (MFP).

Next, the print processing and the post-processing to be performed on the sheets will be described. FIG. 3 is a cross-sectional view illustrating the MFP 101. In FIG. 3, the sheet processing unit 122 is positioned in the housing of the MFP 101. However, the setup location of the sheet processing unit 122 is not limited to the example illustrated in FIG. 3. The sheet processing unit 122 can be an external device adjacently provided and connected to the MFP 101.

A paper feeding unit 301 and a paper feeding unit 302 can store sheets. Although the MFP 101 illustrated in FIG. 3 includes the paper feeding units 301 and 302, the total number of the paper feeding units is not limited to only two. A pair of conveyance rollers 303 can successively convey the sheets from the paper feeding unit 301 to the printing unit 120. Further, a pair of conveyance rollers 304 can successively convey the sheets from the paper feeding unit 302 to the printing unit 120. The printing unit 120 can print an image on a first surface of the sheet while the sheet is conveyed. The printing unit 120 can be an inkjet type, which is configured to print an image by discharging ink droplets to a sheet, or can be an electrophotographic type, which is configured to print an image by fixing toner particles on a sheet.

When the MFP 101 performs a one-sided print operation, each printed sheet is guided by conveyance rollers 305 and 306 and conveyed by the sheet processing unit 122, and is discharged to an intermediate tray 320.

The intermediate tray 320 is inclined with one end positioned higher in the vertical direction at a downstream side of a sheet conveyance direction (i.e., at the left side of the drawing) and the other end positioned lower in the vertical direction at an upstream side (i.e., at the right side of the drawing). The intermediate tray 320 can hold a plurality of sheets. Further, the intermediate tray 320 includes a bundle discharge roller pair 318, i.e., upper and lower bundle discharge rollers 318a and 318b, disposed on the downstream side and a lead-in paddle 315 disposed at an intermediate portion thereof. The upper bundle discharge roller 318a is supported by a guide 317.

A motor (not illustrated) can move the guide 317 in an up-and-down direction. Therefore, the upper bundle discharge roller 318a provided on the guide 317 can contact with and separate from the lower bundle discharge roller 318b in accordance with the vertical motion of the guide 317. Thus, the clearance between the rollers of the bundle discharge roller pair 318 can be adjusted according to the thickness of a sheet bundle held on the intermediate tray.

The CPU 111 causes the guide 317 to move upward in such a way to separate the lower bundle discharge roller 318b from the upper bundle discharge roller 318a and causes a sheet P to be discharged by conveyance rollers 306 and received by the intermediate tray 320.

Further, two adjusting members 321 are provided on both sides of the intermediate tray 320 in a width direction perpendicular to the sheet conveyance direction. A front adjusting motor (not illustrated) and a back adjusting motor (not illustrated) can move the adjusting members 321 in the width direction. The front adjusting member 321 is positioned on a "near side" and the back adjusting member 321 is positioned on a "far side", when seen in the side view of the MFP 101 illustrated in FIG. 3. The lead-in paddle 315 can rotate around a rotational axis thereof in a predetermined direction (e.g., in the counterclockwise direction in FIG. 3) to press a sheet toward a stopper 316.

The inclination of the intermediate tray 320 and the sheet pressing function of the lead-in paddle 315 cooperatively cause the sheet P having been guided by the conveyance rollers 306 and discharged to the intermediate tray 320 to slide down onto a loading surface of the intermediate tray 320 or onto sheets stacked on the intermediate tray 320. Each sheet having been discharged onto the intermediate tray 320 is subjected to adjustment processing performed by the adjusting members 321 while the sheet slides down and stops when the rear end thereof (i.e., the upper stream end in the discharge direction) collides with the stopper 316.

The staple binding unit 314a or the stapleless binding unit 314b performs binding processing, if necessary, on an adjusted sheet bundle on the intermediate tray 320. Each of the staple binding unit 314a and the stapleless binding unit 314b is movable in a direction perpendicular to the sheet conveyance direction and can reach a binding position designated by a user. Respective binding units 314a and 314b can bind the sheet bundle held on the intermediate tray 320 at a rear end portion thereof in the conveyance direction.

When the post-processing including the binding processing performed by the sheet processing unit 122 completes, the sheet bundle is discharged to a discharge portion 307. More specifically, the guide 317 is moved in such a way as to bring the bundle discharge roller 318a into contact with the uppermost sheet stacked on the intermediate tray 320 and the bundle discharge roller pair 318 is rotated while keeping the contact with the uppermost sheet, so that the sheet bundle having been finished through the post-processing is discharged onto the discharge portion 307.

Next, when the MFP 101 performs a two-sided print operation, a sheet is guided to a conveyance roller pair 308 after the printing unit 120 prints an image on a first surface of the sheet. The conveyance roller pair 308 conveys the sheet to a conveyance roller pair 309. The conveyance roller pair 309 conveys the sheet to a reversing path 310. When the rear end of the sheet reaches the conveyance roller pair 309, the conveyance roller pair 309 starts rotating in the reverse direction to convey the sheet to a conveyance roller pair 311. The conveyance roller pair 311 conveys the sheet to a conveyance roller pair 313 via a two-sided print conveyance path 312. The conveyance roller pair 313 conveys the sheet to the printing unit 120. The printing unit 120 prints an image on a second surface of the sheet. The two-sided printed sheet is guided by the conveyance rollers 305 and 306. The conveyance rollers 305 and 306 convey the sheet to the sheet processing unit 122. The sheet processing unit 122 performs post-processing (e.g., binding processing) on the sheet, in the same manner as the processing performed in the one-sided print operation.

Figure 4:
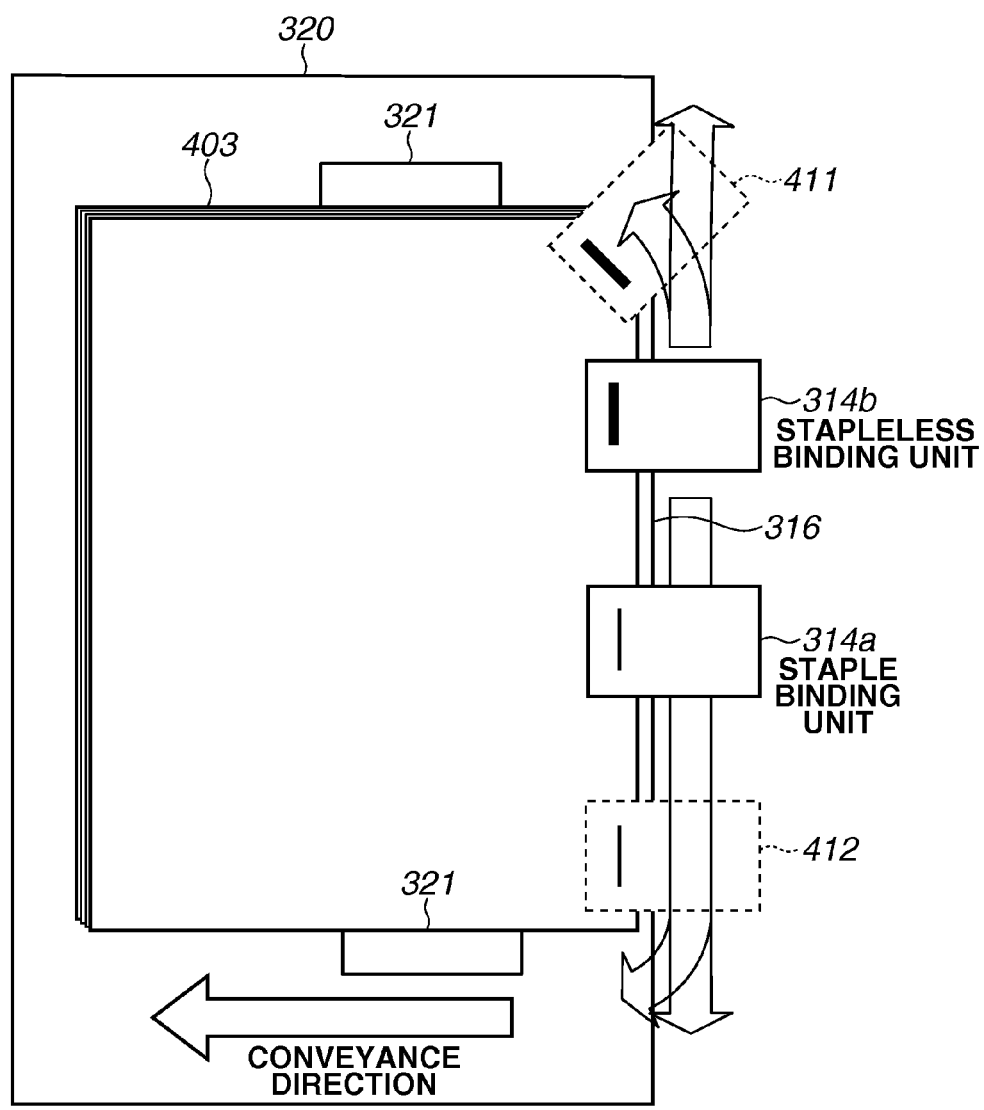
FIG. 4 illustrates binding processing performed by binding units.

FIG. 4 illustrates the binding position of the binding unit 314a or 314b, and a plurality of sheets 403. The sheet processing unit 122 causes the binding unit 314a or 314b to move to the binding position to bind the plurality of sheets 403 according to information relating to the binding processing received from the CPU 111. For example, the CPU 111 causes the binding unit 314a or 314b to move to a position 411 or to a position 412 where the binding unit 314a or 314b can bind the sheet bundle 403.

Further, the staple binding unit 314a and the stapleless binding unit 314b may be integrated as a single unit provided in the sheet processing unit 122. Although FIG. 4 illustrates movable regions of the binding units 314a and 314b, the movable regions of respective binding units may be further widened if necessary. Further, in a case where a staple binding unit (not illustrated) is provided independent of the stapleless binding unit 314b, it is desired to provide a retreat region for preventing respective binding units from physically interfering with each other.

The staple binding unit 314a performs binding processing by binding a plurality of sheets discharged onto the intermediate tray 320 with a staple needle (not illustrated), which is hereinafter referred to as "staple binding process". The staple binding unit 314a includes a cartridge (not illustrated) of staple needles. Each user can exchange cartridges to replenishing staple needles.

The CPU 111 appropriately acquires the upper-limit number of sheets (e.g., 50 sheets if the sheet type is plain paper)

that the staple binding unit 314a can bind together via the sheet processing unit 122 and the sheet processing unit I/F 121, and stores the acquired information in the RAM 113 or the storage 114. The information relating to the upper-limit number of sheets can be referred to when the CPU 111 performs processing according to flowcharts described below. The upper-limit number of sheets may be variable depending on the length of staple needles replenished in the cartridge. Further, the upper-limit number of sheets differentiated for each sheet type can be set for the staple binding unit 314a. Further, it may be useful to differentiate the upper-limit number of sheets according to the sheet size.

Figure 5A:
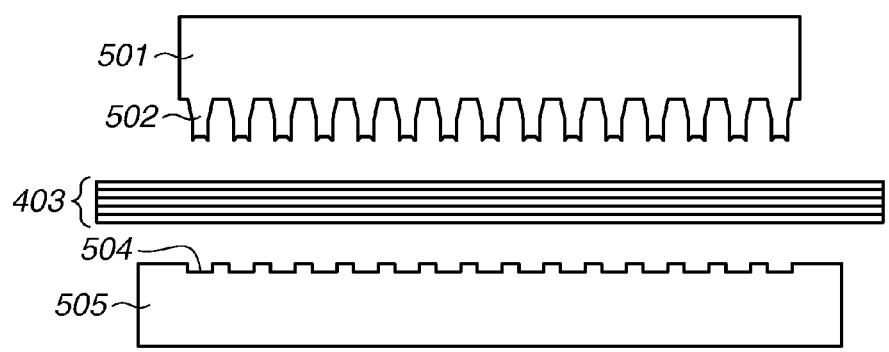
FIGS. 5A, 5B, and 5C illustrate press-bonding performed by a stapleless binding unit.

FIG. 5A illustrates binding processing that can be performed by the stapleless binding unit 314b, which is characterized by binding a plurality of sheets without using any staple (hereinafter, referred to as "stapleless binding process"). In the present exemplary embodiment, the stapleless binding unit 314b applies a vertical pressure on respective sheets of the sheet bundle 403 to bind the sheet bundle 403 tightly. FIG. 5A illustrates a state where the stapleless binding unit 314b has moved to the binding position to bind the sheet bundle 403. An upper die 501 pushes the plurality of sheets from the above. The upper die 501 includes a plurality of convex blades 502 aligned along an edge thereof. Each blade 502 gives a pressure to the sheet. A lower die 505 pushes the plurality of sheets from the bottom. The lower die 505 includes a plurality of recesses 504 that can be coupled with the corresponding blades 502.

Figure 5B:
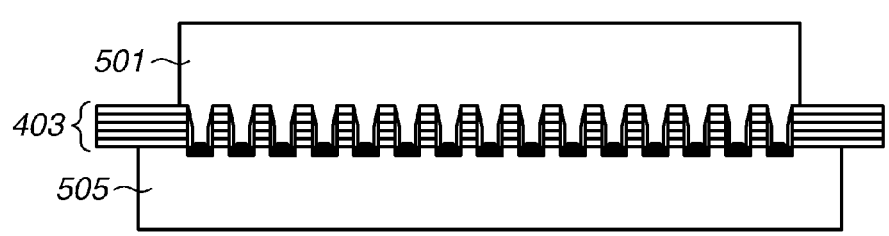

FIG. 5B illustrates a state where the plurality of sheets have been pressed vertically by the upper die 501 and the lower die 505. When the upper die 501 and the lower die 505 cooperatively press the plurality of sheets, the plurality of sheets can be bound firmly. Further, the plurality of blades 502 and the plurality of recesses 504 can press the sheets at a plurality of portions thereof, so that the sheets are prevented from separating from each other.

The CPU 111 appropriately acquires the upper-limit capability (e.g., five sheets if the sheet type is plain paper) that the stapleless binding unit 314b can bind together via the sheet processing unit 122 and the sheet processing unit I/F 121, and stores the acquired information in the RAM 113 or the storage 114. The information relating to the upper-limit capability can be referred to when the CPU 111 performs processing according to the flowcharts described below.

In the present exemplary embodiment, the upper-limit number of sheets differentiated for each sheet type can be set for the stapleless binding unit 314b. Prohibiting the stapleless binding process, if the sheet type is inappropriate, is feasible. Further, it may be useful to differentiate the upper-limit number of sheets according to the sheet size.

Figure 5C:

FIG. 5C illustrates the sheet bundle 403 that has been finished through the binding processing. As illustrated in FIG. 5C, the sheet bundle 403 having been finished through the stapleless binding process is bound by press-bonding sheets while party deforming respective sheets.

Figure 6:
FIG. 6 illustrates a plurality of sheets finished through the binding processing.

Further, FIG. 6 illustrates the sheet bundle 403 having been finished through the staple binding process. As illustrated in FIG. 6, the sheet bundle 403 finished through the staple binding process is bound with a metal staple needle 601 that passes completely through to the other side of the sheet bundle 403.

As mentioned above, the stapleless binding process is characterized by press-bonding a plurality of sheets. Therefore, the number of sheets that can be bound together through the stapleless binding process is relatively small compared to the staple binding process that uses a needle. Further, the upper-limit number of sheets bound together is variable depending on the sheet type because the press-bonding force acting between sheets in the stapleless binding process is variable depending on surface properties and grammage of respective sheets.

The MFP 101 according to the present exemplary embodiment has the job holding function. Therefore, it is feasible to change the settings of a hold job stored in the hold queue. Accordingly, if a setting change occurs in a hold job that includes setting of the binding processing, the number of sheets to be printed or the sheet type may change. In this case, the MFP 101 may perform the binding processing for the job unintendedly due to such a setting change. Further, if a setting change occurs in a job that includes setting of the staple binding process, the number of sheets to be printed may decrease significantly and the sheets may be bound together through the stapleless binding process.

In view of the foregoing problems, the present exemplary embodiment intends to inquire whether a user wants to change the type of the binding processing with reference to the content of a setting change if the setting change occurs in a job that includes setting of the binding processing, as described in detail below.

If a user starts operating the MFP 101, a home screen (not illustrated) can be displayed to allow the user to select processing to be performed. The user can select a desired function (e.g., the job holding function, the copy function, or a transmission function) of the MFP 101 via the operation unit 116.

Figure 7A:
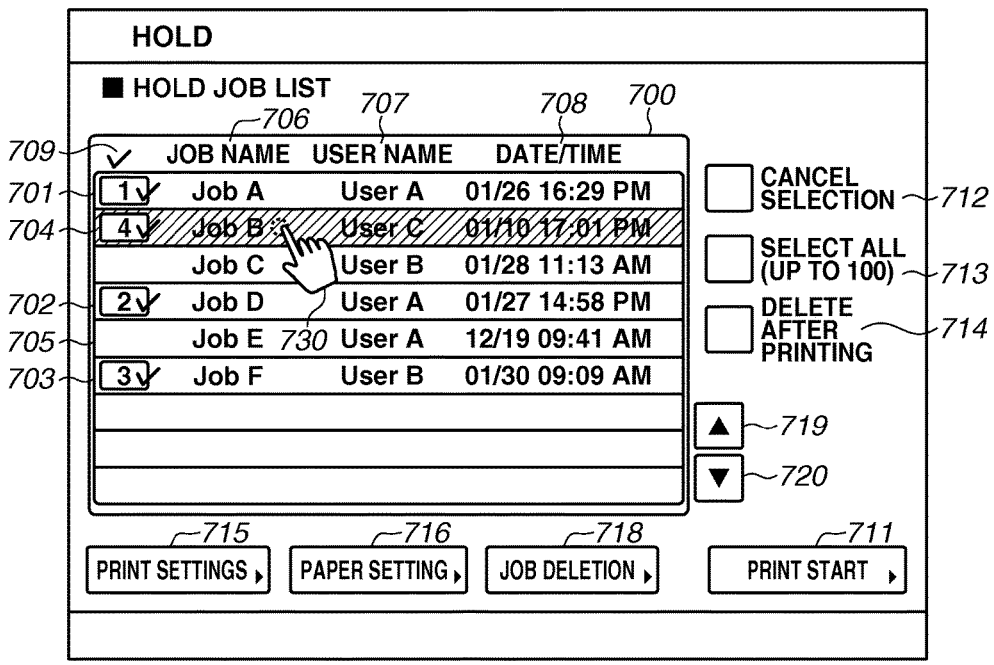
FIGS. 7A and 7B illustrate operation screens that can be displayed on a panel.
Figure 7B:
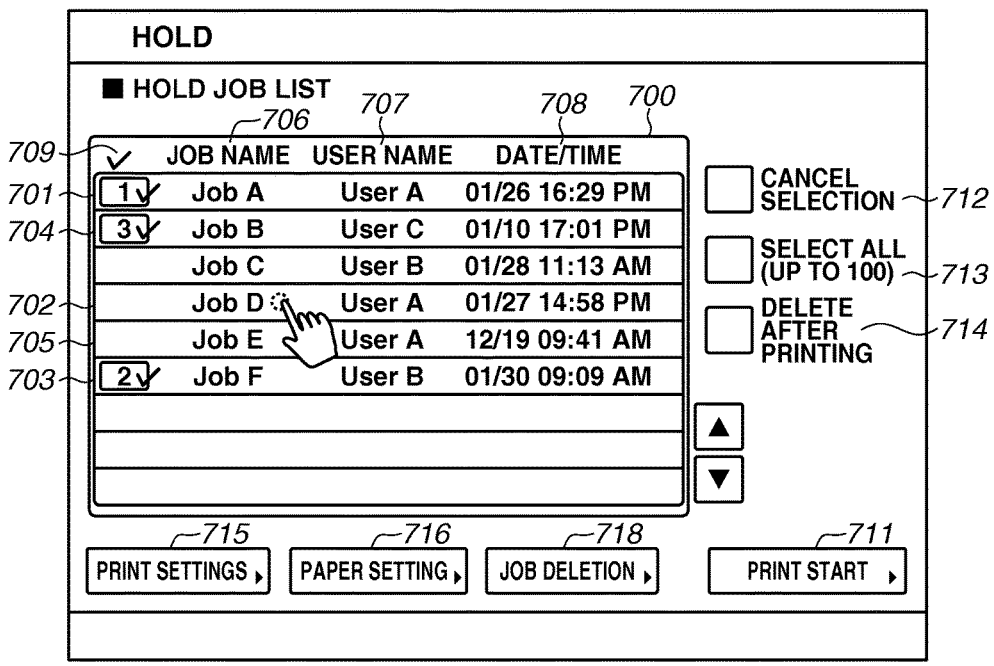

FIGS. 7A and 7B illustrate examples of the operation screen that the CPU 111 can display on the panel 201 of the operation unit 116. The user performs entries and/or selections necessary for a hold job stored in the hold queue via the screens illustrated in FIGS. 7A and 7B.

A region 700 is a region provided to display a list of jobs having been held. The region 700 is constituted by a plurality of rows, each of which displays information about a job being held. An item 706 is a job name item that indicates the name of each job having been held. An item 707 is a user name item that indicates the name of each user who has input the job having been held. An item 708 is a date/time item that indicates input data and time of each job being held. An item 709 indicates the selection state of each job. A checkmark is added to each job when selected. Further, the item 709 displays a serial number allocated to each selected job to notify the user of the print order of each selected job. Although the function of printing a hold job has been described in the present exemplary embodiment, the present invention is not limited to the above-mentioned example. For example, a function of transmitting image data and PDF data included in a job being held to an external apparatus may be included.

Further, keys 719 and 720 are scroll keys that can be used to scroll displayed rows when the number of jobs to be displayed exceeds the size of the region 700.

In the present exemplary embodiment, information displayed as a list relating to respective jobs being held are only three items 706 to 709. However, the present invention is not limited to the above-mentioned example. For example, the information to be displayed can include the number of pages, staple settings, and information necessary for a user to identify each job.

A user can touch a row displayed in the region 700 with an object 730, such as a finger or a touch pen, to designate and switch the selection state of each job displayed in the list.

FIG. 7A illustrates a state where a row 704 is touched by the object 730 and "Job B" is selected. In FIG. 7A, respective rows 701 to 704 indicate selected jobs. Further, the row 702 is the finally selected job. The CPU 111 applies background color to the row corresponding to the finally selected job to notify a user of the finally selected job. A row 705 indicates a non-selected job. A key 715 and a key 716 allows a user to change the print settings and the paper setting for the finally selected job. Hereinafter, the finally selected job is referred to as "target job" in the present exemplary embodiment.

The user can select a non-selected job by touching a row corresponding to the non-selected job. The job having been finally selected by the object 730 becomes the target job.

Further, the user can cancel the selection of each selected job by touching a row corresponding to the selected job. FIG. 7B illustrates a state where the selected row 702 is touched by the object 730 and the selection of "Job D" has been cancelled. When the selection of "Job D" has been cancelled by a user operation, the printing order moves up for each of "Job F" in the row 703 and "Job B" in the row 704, as illustrated in FIG. 7B.

In the case where the selection of a job is cancelled, it means that the last operation is cancelling the selection of the job. Therefore, the "Job B" is no longer the target job. In such a case, it is useful to employ gray-out display for the keys 715 and 716 to indicate that the target job is not present as illustrated in FIG. 7B.

Further, a key 711 is a start instruction key that can be used to instruct starting a print operation of the selected job. A key 718 is a deletion key that can be used to delete the selected job from the hold queue. If the CPU 111 determines that the key 711 has been touched, the CPU 111 converts the selected hold job into a print job and inputs the print job into the Print queue. The printing unit 120 performs printing on a sheet according to the job having being input in the Print queue. On the other hand, if the CPU 111 determines that the key 718 has been touched, the CPU 111 deletes the selected hold job from the hold queue.

Further, a key 712 is a cancellation key that can be used to cancel the selection of a designated job. A key 713 is a selection key that can be used to shift all jobs into a selected state. A key 714 is a cancellation key that can be used to delete a selected job after completion of the printing of the job.

A key 715 is a setting key that can be used to change print settings for the target job. A user can appropriately change various settings (e.g., number of printed copies, color mode (monochrome or color), color tone, printing method (one-sided print or two-sided print), page aggregation, staple type, and cover pages) for each job by touching the key 715. Further, a key 716 is a setting key that can be used to change paper settings (type of printing sheet) of the target job.

FIGS. 8A and 8B and FIGS. 9A and 9B illustrate examples of setting change screens displayed on the panel 201 of the operation unit 116. FIG. 8A illustrates an example of the operation screen that allows a user to change staple related settings. If the CPU 111 determines that the key 715 has been touched, the CPU 111 displays a print setting screen (not illustrated) that allows the user to change the print settings. In the present exemplary embodiment, the staple related settings are a part of the print settings. It is assumed that the operation screen of the panel 201 shifts to the screen illustrated in FIG. 8A when the user selects the staple related setting change from the print setting screen (not illustrated).

The user changes the staple related settings via the screen illustrated in FIG. 8A. A key 802 is a staple key that can be used to select the staple binding process as the staple type.

Further, a key 803 is a stapleless key that can be used to select the stapleless binding process as the staple type. Two keys 802 and 803 are in an exclusive relationship. Either one of these keys 802 and 803 is selectable. Further, if none of the key 802 and the key 803 is selected, no binding processing is set. Information 804 notifies a user of the position where the binding processing is performed. Further, keys 805 to 808 are direction keys that can be used to select the binding position.

Further, a key 812 is an OK key that can be used to save the changed staple related settings and close the setting screen. If the key 812 has been touched, the CPU 111 applies the settings having been set via the screen. On the other hand, a key 811 is a cancellation key that can be used to discard the staple related settings changed by the user and close the setting screen.

If a hold job including the "staple binding process" setting is changed to perform the "stapleless binding process", the upper-limit number of sheets for which the binding processing can be performed is decreased from appropriately 50 sheets (plain paper) to five sheets (plain paper). Therefore, the number of sheets to be printed may exceed the upper-limit number of sheets for which the binding processing can be performed.

Next, FIG. 8B is an example of the operation screen that allows a user to change settings relating to page aggregation and printing method. In the present exemplary embodiment, the page aggregation and printing method related settings are a part of the print settings. It is assumed that the operation screen of the panel 201 shifts to the screen illustrated in FIG. 8B when the user selects the page aggregation and printing method related setting change from the print setting screen (not illustrated).

The user changes the page aggregation settings, printing method settings, and paper size via the screen illustrated in FIG. 8B. A key 820 is a 2in1 key that can be used to perform print setting in such a way as to allocate two pages on one surface. A key 821 is a 4in1 key that can be used to perform setting in such a way as to allocate four pages on one surface. Further, a key 822 is an 8in1 key that can be used to perform setting in such a way as to allocate eight pages on one surface. Three keys 820 to 822 are in an exclusive relationship. Either one of these keys 820 to 822 is selectable. Further, if none of the keys 820 to 822 is selected, the print setting is performed in such a way as to allocate one page on one surface. A key 825 is a details key that can be used to perform detailed settings, including the order of allocated layout.

Further, a key 823 is a paper size key that can be used to change the size of a paper to be printed (i.e., sheet size). A key 824 is a two-sided key that can be used to switch the printing method. The key 824 can be pressed to switch the one-sided print, which performs printing only on the front surface of a sheet, to the two-sided print, which performs printing on both the front and back surfaces of a sheet. FIG. 8B illustrates an OFF state of the key 824, i.e., a state where the one-sided print is selected as the printing method.

Further, a key 811 is a cancellation key that can be used to discard the settings. A key 812 is an OK key that can be used to apply the setting.

For example, if the print settings of a hold job are changed from "total number of pages=10 pages, 2in1, and two-sided print" to "no page aggregation and one-sided print", the number of sheets to be printed increases from three sheets to 20 sheets.

Further, for example, if the total number of pages is 30 pages and the print settings of a hold job are changed from "no page aggregation, and one-sided print" to "4in1 and two-sided print", the number of sheets to be printed decreases from 30 sheets to four sheets. As mentioned above, if the page aggregation function or the printing method is changed, the number of sheets to be printed increases or decreases.

Figure 9A:
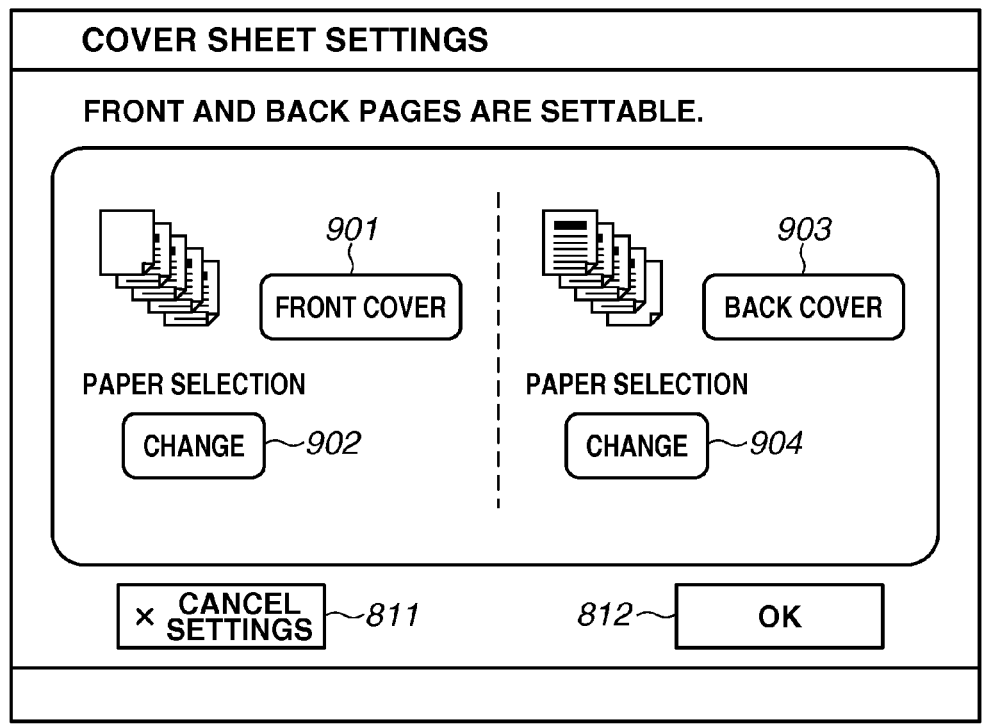
FIGS. 9A and 9B illustrate operation screens displayed on the panel.

Next, FIG. 9A is an example of the operation screen that allows a user to change cover sheet related settings. In the present exemplary embodiment, the cover sheet related settings are a part of the print settings. It is assumed that the operation screen of the panel 201 shifts to the screen illustrated in FIG. 9A when the user selects the cover sheet related setting change from the print setting screen (not illustrated).

A key 901 is a front cover key that can be used to add a front cover. Further, a key 902 is a change key that can be used to set the type (sheet type) of a paper to be used as the front cover. On the other hand, a key 903 is a back cover key that can be used to add a back cover. A key 904 is a change key that can be used to set the type (sheet type) of a paper to be used as the back cover.

A key 811 is a cancellation key that can be used to discard the settings. A key 812 is an OK key that can be used to apply the settings.

If the settings relating to the front and back covers have been changed via the screen illustrated in FIG. 9A, the number of sheets to be printed increases or decreases.

Figure 9B:
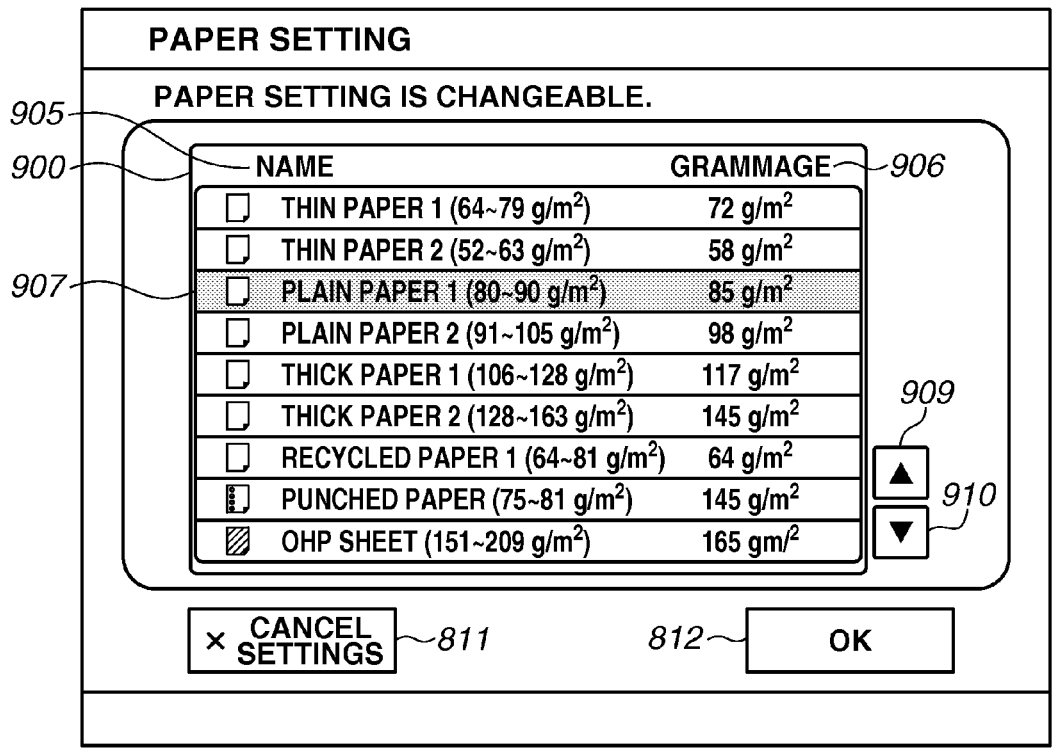

FIG. 9B illustrates an example of the operation screen that allows a user to change the paper setting, in which "plain paper 1 (80 to 90 g/m$^2$)" illustrated in a row 907 is selected as the sheet to be printed. If the CPU 111 determines that the key 716 has been touched, the CPU 111 displays the paper setting screen illustrated in FIG. 9B on the operation unit 116. The user can change the paper setting used for the target job via the screen illustrated in FIG. 9B.

A region 900 is a display region of a list of sheets, in which each row indicates information about a paper (sheet). An item 905 notifies a user of names of registered sheets. An item 906 notifies a user of grammage amounts of respective sheets. Further, keys 909 and 910 are scroll keys.

The user can designate an intended sheet type to be selected in the print by touching the corresponding row displayed in the region 900. In the present exemplary embodiment, the sheet setting is changed entirely for all sheets to be used in the print. However, for example, it is feasible to change the sheet type for each page.

Further, a key 811 is a cancellation key that can be used to discard the settings. A key 812 is an OK key that can be used to apply the settings.

It is useful to set the upper-limit number of sheets for which the binding processing can be performed for each sheet type. In this case, if a user changes the type of sheets to be used in the print via the screen illustrated in FIG. 9B, the upper-limit number of sheets for which the staple binding process or the stapleless binding process can be performed changes. In this case, it is useful to set the upper-limit number of sheets for which the binding processing can be performed with reference to the grammage and surface properties of each sheet. For example, the upper-limit number of OHP sheets or thick papers is smaller than that of the plain papers. On the other hand, the upper-limit number of thin papers is greater than that of the plain papers. Further, it may be useful to set the upper-limit number of specific sheets to 0. In this case, the MFP 101 does not perform the binding processing for the specific sheets because the upper-limit number of sheets is set to 0. The screens illustrated in FIGS. 8B, 9A, and 9B illustrate setting changes that may have an influence on the staple settings. However, the setting changes are not limited to the above-mentioned examples. For example, there will be other setting changes that may change the number of sheets to be printed and the sheet type.

Figure 10:
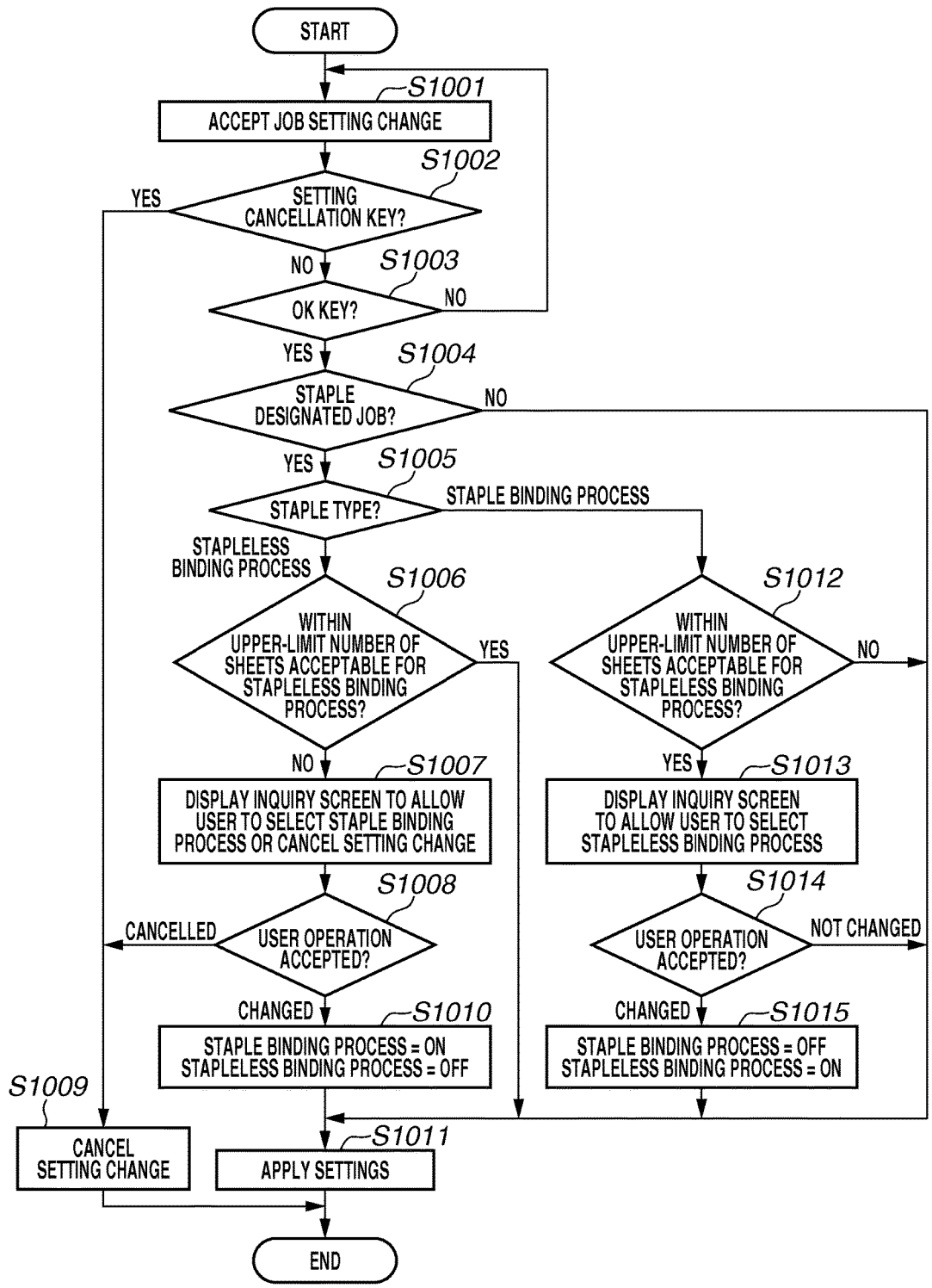
FIG. 10 is a flowchart illustrating a control method relating to job setting change.

Next, a setting change control method according to the present exemplary embodiment will be described in detail. FIG. 10 is a flowchart illustrating a hold job setting change control. To realize each operation (step) of the flowchart illustrated in FIG. 10, the CPU 111 executes the related control program loaded into the RAM 113 from the ROM 112 or the storage 114.

If a user touches the key 715 or the key 716 displayed on the operation unit 116, the CPU 111 executes the control program corresponding to the flowchart illustrated in FIG. 10. In step S1001, the CPU 111 accepts a job setting change based on a key input via the operation unit 116. In step S1002, the CPU 111 determines whether the key 811 has been touched. If the CPU 111 determines that the key 811 has been touched (YES in step S1002), the operation proceeds to step S1009. In step S1009, the CPU 111 discards the setting change accepted in step S1001 and shifts the operation screen to the hold job lists illustrated in FIGS. 7A and 7B. Then, the CPU 111 terminates the processing of the flowchart illustrated in FIG. 10. On the other hand, if the CPU 111 determines that the key 811 has not been touched (NO in step S1002), the operation proceeds to step S1003.

In step S1003, the CPU 111 determines whether the key 812 has been touched. If the CPU 111 determines that the key 812 has been touched (YES in step S1003), the operation proceeds to step S1004. On the other hand, if the CPU 111 determines that the key 812 has not been touched (NO in step S1003), the operation returns to step S1001 to accept another job setting change.

In step S1004, the CPU 111 determines whether there is any binding processing (staple processing) being currently set with reference to the print attribute information about the target job stored in the RAM 113 or the storage 114. If the CPU 111 determines that the job print attribute information includes the designation of the binding processing (YES in step S1004), the operation proceeds to step S1005. On the other hand, if the CPU 111 determines that the binding processing is not designated (NO in step S1004), the operation proceeds to step S1011.

In step S1005, the CPU 111 identifies the type of the staple processing being set for the target job. If the selected type is the staple binding process (STAPLE BINDING PROCESS in step S1005), the operation proceeds to step S1012. If the selected type is the stapleless binding process (STAPLELESS BINDING PROCESS in step S1005), the operation proceeds to step S1006.

First, a setting control to be performed in step S1006 and subsequent steps when the selected type is the stapleless binding process will be described. In step S1006, the CPU 111 determines whether the number of sheets to be printed when the setting change is applied is equal to or less than the upper-limit number of sheets allowable when the stapleless binding process is performed. The CPU 111 acquires the upper-limit number of sheets for the stapleless binding unit 314b from the storage 114 or the RAM 113. In a case where the upper-limit number of sheets is set beforehand for each sheet type, the CPU 111 acquires the upper-limit number of sheets corresponding to the type of sheets with reference to the sheet type being set for the job. If the CPU 111 determines that the number of sheets to be printed when the setting change is applied is equal to or less than the acquired upper-limit number of sheets (YES in step S1006), the operation proceeds to step S1011. On the other hand, if the CPU 111 determines that the number of sheets to be printed when the setting change is applied is greater than the acquired upper-limit number of sheets (NO in step S1006), the operation proceeds to step S1007. In a case where the upper-limit number of sheets is set beforehand for each sheet type, a numerical value "0" may be allocated to a specific sheet type as the upper-limit number of sheets for which the binding processing can be performed.

Figure 11A:
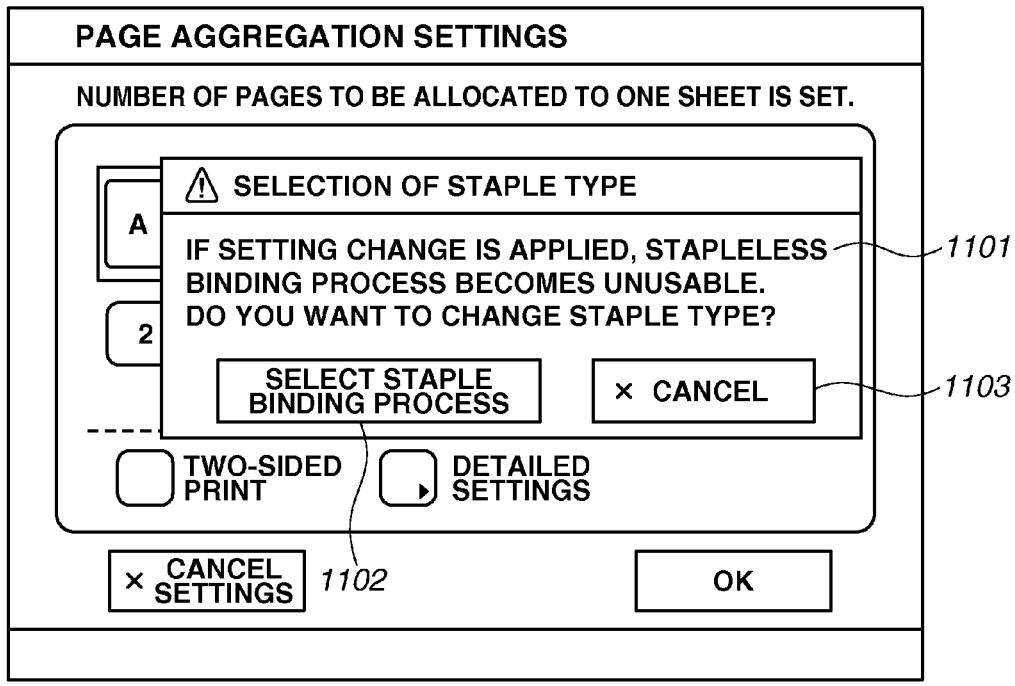
FIGS. 11A, 11B, and 11C illustrate operation screens displayed on the panel.

In step S1007, the CPU 111 displays an inquiry screen (e.g., a pop-up screen) that inquires whether a user wants to change the staple type to the staple binding process or cancel the change of the print settings. FIG. 11A illustrates an example of the operation screen that the CPU 111 can display on the panel 201 of the operation unit 116. Information 1101 is notification information that notifies a user that the stapleless binding process cannot be used if the setting change is applied and that the staple type can be changed via the inquiry.

A key 1102 is a change key that can be used to change the staple type to the staple binding process and apply the setting change. On the other hand, a key 1103 is a cancellation key that can be used to discard the setting change accepted in step S1001.

Referring back to FIG. 10, in step S1008, the CPU 111 accepts a user instruction via the pop-up screen illustrated in FIG. 11A. If the key 1102 has been touched (YES in step S1008), the operation proceeds to step S1010. If the key 1103 is touched (NO in step S1008), the operation proceeds to step S1009. In step S1010, the CPU 111 sets the staple binding process to valid (ON) and sets the stapleless binding process to invalid (OFF). Then, the operation proceeds to step S1011.

In step S1011, the CPU 111 changes the print settings of the target job stored in the RAM 113 or the storage 114. Further, the CPU 111 shifts the operation screen to the hold job screen illustrated in FIG. 7, and terminates the processing of the flowchart illustrated in FIG. 10.

Next, a setting control to be performed in step S1012 and subsequent steps when the staple type being set for the target job is the staple binding process will be described.

In step S1012, the CPU 111 refers to the print attribute information and determines whether the number of sheets to be printed when the setting change is applied is equal to or less than the upper-limit number of sheets allowable when the stapleless binding process is performed. The CPU 111 acquires the upper-limit number of sheets for the stapleless binding unit 314b from the storage 114 or the RAM 113. In a case where the upper-limit number of sheets is set beforehand for each sheet type, the CPU 111 acquires the upper-limit number of sheets corresponding to the type of sheets with reference to the sheet type being set for the job.

If the CPU 111 determines that the number of sheets to be printed when the setting change is applied is equal to or less than the acquired upper-limit number of sheets (YES in step S1012), the operation proceeds to step S1013. On the other hand, if the CPU 111 determines that the number of sheets to be printed is greater than the acquired upper-limit number of sheets (NO in step S1012), the operation proceeds to step S1011. In step S1011, the CPU 11 applies the settings, and terminates the processing of the flowchart illustrated in FIG. 10.

Figure 11B:
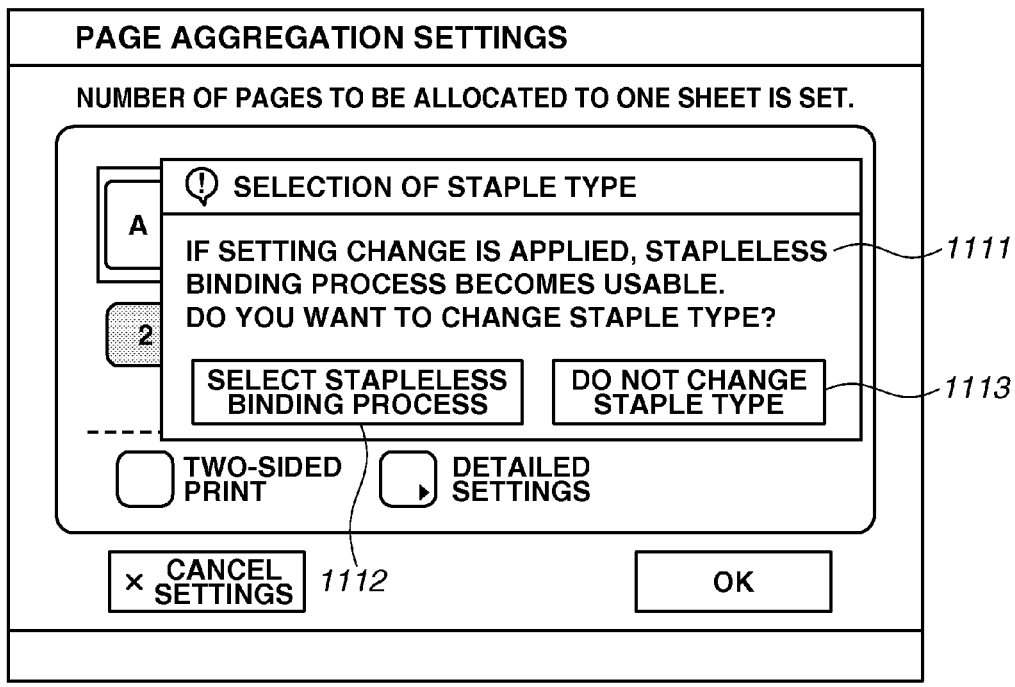

In step S1013, the CPU 111 displays an inquiry screen (e.g., a pop-up screen) to inquire whether the user wants to change the staple type to the stapleless binding process. FIG. 11B illustrates an example of the operation screen that the CPU 111 can display on the panel 201 of the operation unit 116. Information 1111 is notification information that notifies a user that the stapleless binding process can be used if the setting change is applied and that the staple type can be changed via the inquiry.

A key 1112 is a change key that can be used to change the staple type to the stapleless binding process and apply the setting change. On the other hand, a key 1113 is a non-change key that can be used to apply the setting change without changing the staple type (without cancelling the staple binding process).

Referring back to FIG. 10, in step S1014, the CPU 111 accepts a user instruction via the pop-up screen illustrated in FIG. 11B. If the CPU 111 determines that the key 1112 has been touched (CHANGED in step S1014), the operation proceeds to step S1015. If the CPU 111 determines that the key 1113 has been touched (NOT CHANGED in step S1014), the operation proceeds to step S1011.

In step S1015, the CPU 111 sets the staple binding process to invalid (OFF) and sets the stapleless binding process to valid (ON). Then, the operation proceeds to step S1011. In step S1011, the CPU 111 applies the settings, and terminates the processing of the flowchart illustrated in FIG. 10.

As mentioned above, in the first exemplary embodiment, the CPU 111 compares the number of sheets to be printed when the setting change is applied to a job with the upper-limit number of sheets allowable for the stapleless binding process. If the usable staple type is changed, the CPU 111 performs inquiry processing. If the above-mentioned comparison reveals that the stapleless binding process is unusable for the binding processing, the CPU 111 inquires whether the user changes the staple type to the staple binding process. Accordingly, the user can select the staple type appropriately in response to each setting change. Further, the user can cancel the setting change via the inquiry screen so that the binding processing can be performed as scheduled initially without cancelling the stapleless binding process.

Further, in the first exemplary embodiment, if the above-mentioned comparison reveals that the stapleless binding process is usable for the binding processing, the CPU 111 inquires whether the user selects the stapleless binding process. Accordingly, the user can reselect the staple type in response to each setting change.

In the present exemplary embodiment, the CPU 111 discards the settings if the key 1103 illustrated in FIG. 11A is touched and the operation screen shifts to the job holding function screen illustrated in FIG. 7. However, the processing to be performed by the CPU 111 is not limited to the above-mentioned example. For example, the processing of the flowchart illustrated in FIG. 10 can be modified in such a manner that the operation returns to step S1001 if the key 1103 illustrated in FIG. 11A is touched, while holding the setting change. In this case, the user can adjust the settings again and retry the setting change.

Further, in the present exemplary embodiment, the CPU 111 determines whether there is any change in the usable staple type if the key 812 is touched. However, the processing to be performed by the CPU 111 is not limited to the above-mentioned example. For example, the CPU 111 may perform the above-mentioned determination every time when the user selects a key relating to the number of sheets or a key relating to the sheet type. Further, the CPU 111 can perform the above-mentioned determination in response to the touching operation of any key.

In the first exemplary embodiment, when a user changes a setting of a hold job, the system inquires the user about the binding processing according to the content of the setting change as mentioned above. Compared to the first exemplary embodiment, an image processing apparatus according to a second exemplary embodiment has the capability of setting the staple type in a case where the printer driver inputs a job that designates setting the type of binding processing when the printing is performed, as described below.

An apparatus hardware configuration according to the second exemplary embodiment is similar to that described in the first exemplary embodiment. A constitute element similar to that described in the first exemplary embodiment is denoted by the same reference numeral and redundant description thereof will be avoided.

When the PC 102 transmits print data to the MFP 101, a user can perform various settings for the print data via the print setting screen provided by the printer driver.

Figure 12:
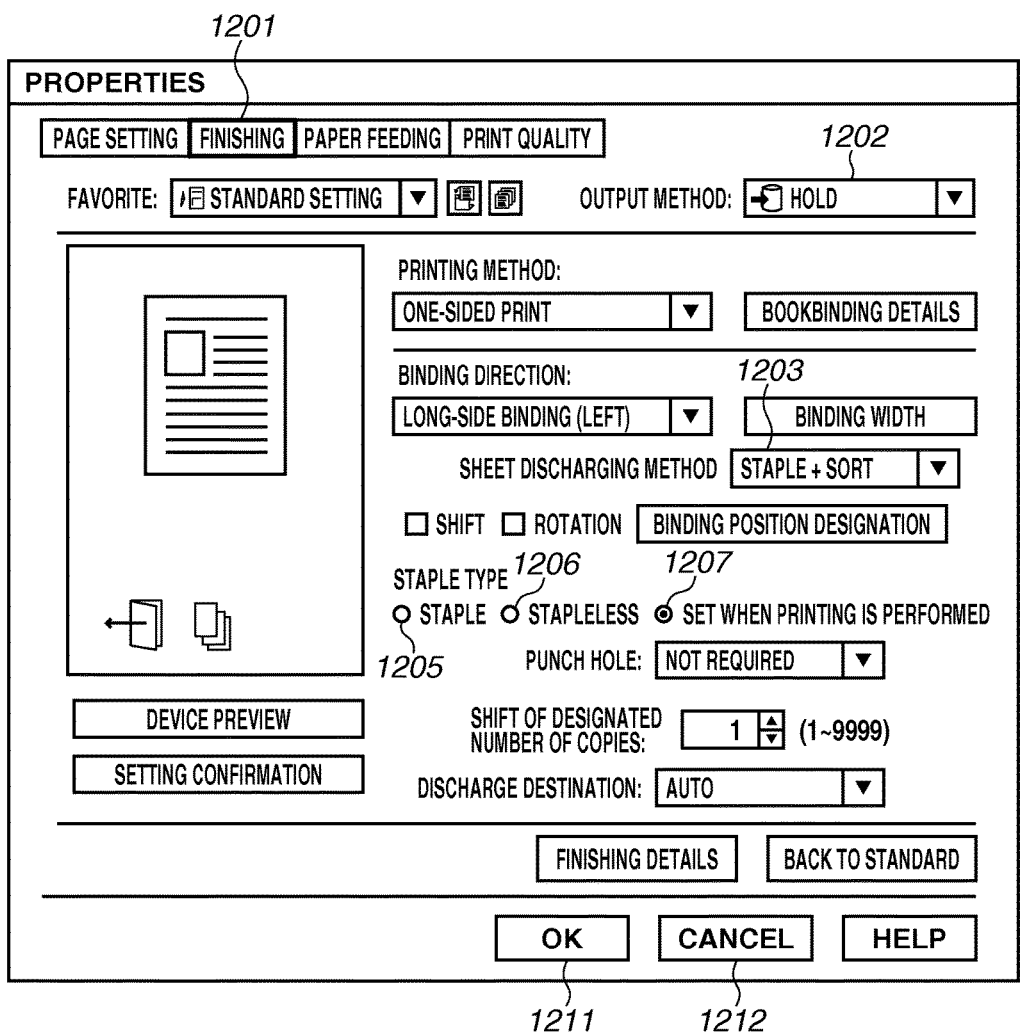
FIG. 12 illustrates an operation screen for setting print data.

FIG. 12 illustrates an example of the print setting screen (i.e., a window) that allows a user to set print data, which can be displayed on a display unit (not illustrated) of the PC 102. FIG. 12 illustrates a state where a finishing setting tab 1201 is active. When a page setting tab is active, the user can perform settings relating to page aggregation and stamp print. When a paper feeding tab is active, the user can designate a sheet type to be used in the print and a cassette from which sheets can be fed. When a print quality tab is active, the user can set a desired print mode and a desired color mode.

Further, when the tab 1201 is active, the user can perform settings relating to the finishing processing. A region 1202 is provided to select a desired method for outputting print data. Currently, in the region 1202, the item "hold" is selected. The selectable output methods include "print", "overtake print", and "hold (see the example illustrated in FIG. 12)". When the user selects the item "print" or "overtake print", the print data is input to the above-mentioned print queue. On the other hand, when the user selects the item "hold", the print data is input to the above-mentioned hold queue.

A region 1203 is provided to set a desired discharge method. Currently, in the region 1203, "staple+sort" is selected. The selectable discharge methods include "staple+sort", "staple+group", "group", and "sort". The item "sort" can be selected to discharge each set of printed product. For example, if it is required to prepare 10 sets of printed products each being constituted by five pages, the MFP 101 repetitively discharges a bundle of five pages that constitutes one set until the number of bundles reaches 10. The item "group" can be selected to discharge a lump of sheets corresponding to the same page. For example, if it is required to prepare 10 sets of printed products each being constituted by five pages, the MFP 101 repetitively discharges a bundle of 10 sheets corresponding to the same page until the number of bundles reaches 5. The item "staple+sort" can be selected to perform binding processing for each bundle of sheets that constitutes one set. Further, the item "staple+group" can be selected to perform binding processing for each bundle of sheets corresponding to the same page.

Further, buttons 1205 to 1207 are operable to select the staple type after the selection in the region 1203 is completed.

The button 1205 is selectable when the user designates the staple binding process in the binding processing. The button 1206 is selectable when the user designates the stapleless binding process in the binding processing. The button 1207 is selectable when the user designates the staple type of the binding processing when the printing is performed. These buttons 1205 to 1207 are in an exclusive relationship. Only one of the buttons 1205 to 1207 is selectable.

Further, a key 1211 is an OK key that can be used to apply the print settings determined via the window illustrated in FIG. 12 to the print data. A key 1212 is a cancellation key that can be used to discard the print settings determined via the window illustrated in FIG. 12. The user can transmit the print data, which have the print settings determined via the window illustrated in FIG. 12, to the MFP 101.

As mentioned above, in the present exemplary embodiment, it is feasible to select the item "set when printing is performed" as one of the staple types. In the present exemplary embodiment, the PC 102 transmits print data to the MFP 101, as an example case where a user selects the staple type. However, the present invention is not limited to the above-mentioned example. For example, the reading unit 118 reads a document and generates a hold job. In such a case, the present invention is applicable similarly.

Figure 13:
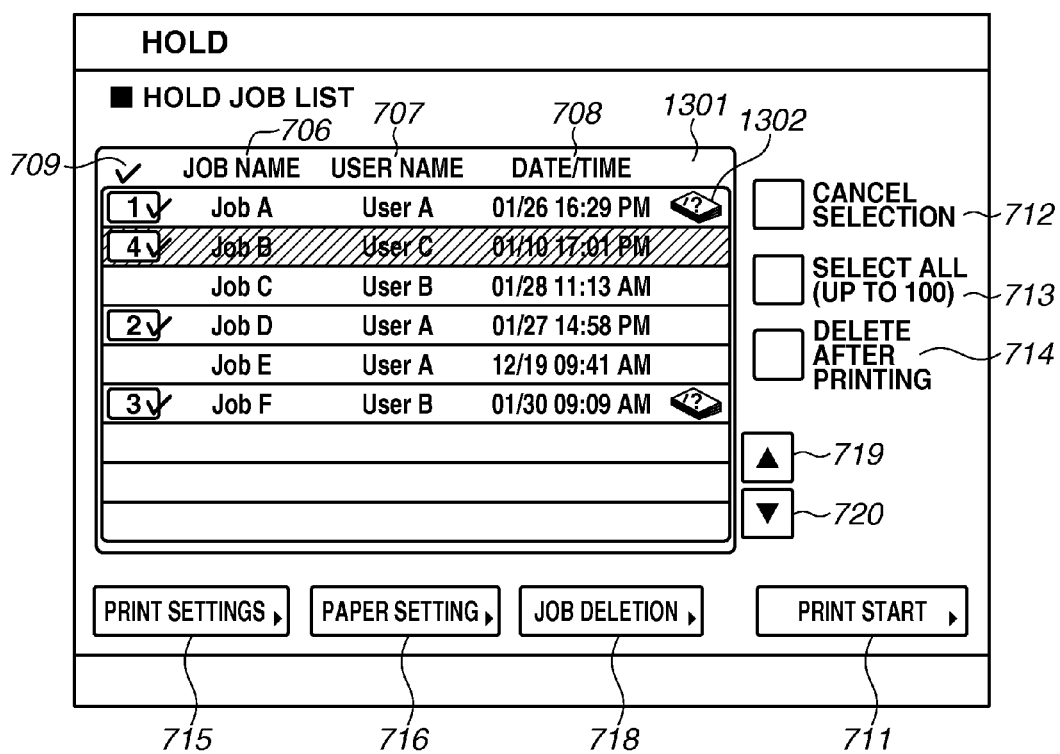
FIG. 13 illustrates an operation screen displayed on the panel.

Next, the job holding function according to the present exemplary will be described. FIG. 13 is an example of a main screen relating to the job holding function, which is comparative to the screen illustrated in FIG. 7A described in the first exemplary embodiment. The main screen illustrated in FIG. 13 includes an item 1301 in addition to the items illustrated in FIG. 7A. The item 1301 is an item newly added to display each staple type. A mark 1302 is a mark used to notify a user that the job includes the item "set when printing is performed" as the staple type. In the present exemplary embodiment, the mark is displayed for the job including the designation "set when printing is performed". However, for example, it is useful to display a mark corresponding to each staple type for the job that includes the designation of the staple binding process or the stapleless binding process.

The setting items that can be changed with the keys 715 and 716 are similar to those described in the first exemplary embodiment and therefore redundant description thereof will be avoided.

Figure 16:
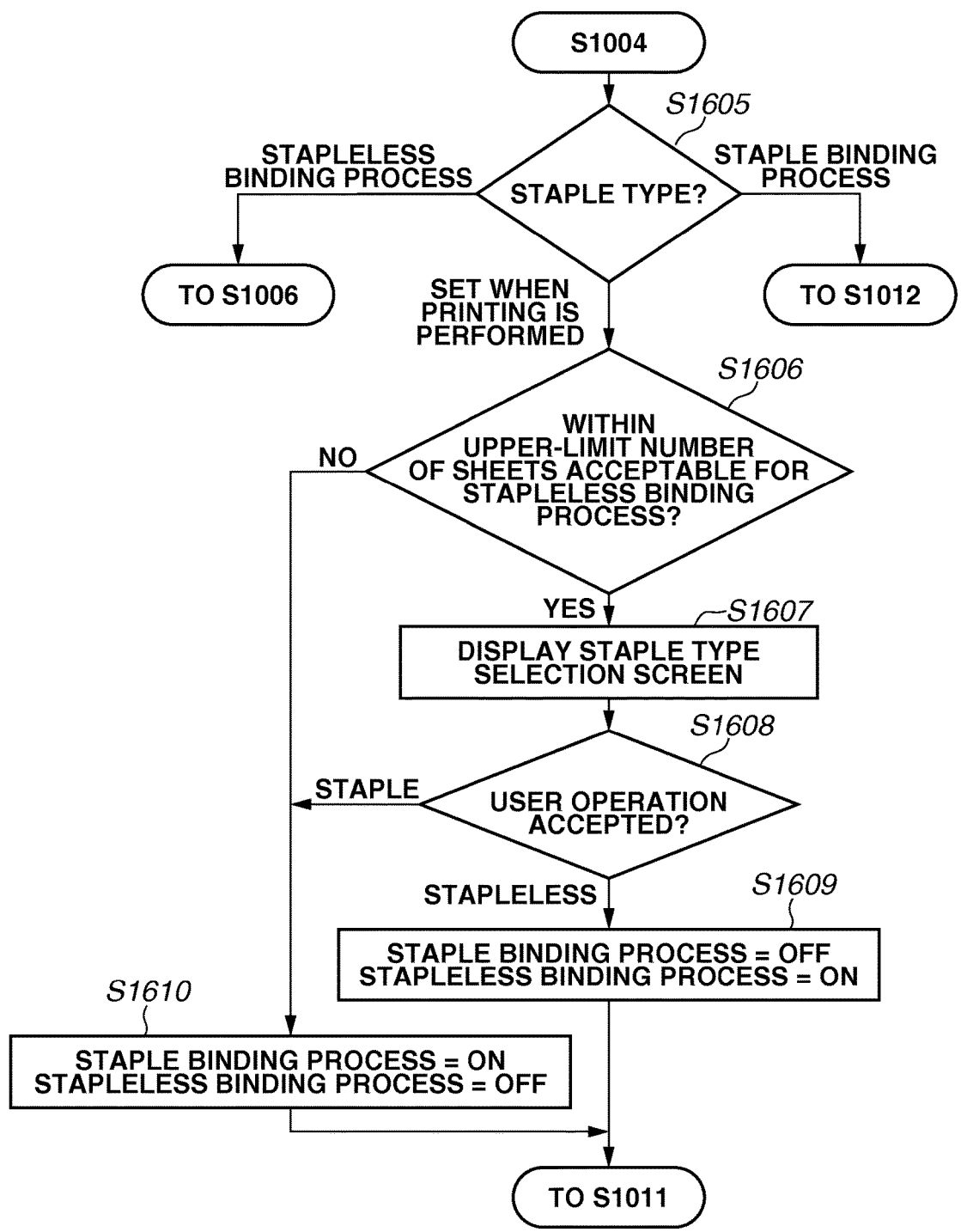
FIG. 16 is a flowchart illustrating a control method relating to job setting change.

First, a control relating to the setting change performed with the keys 715 and 716 will be described in detail below with reference to the flowcharts illustrated in FIGS. 10 and 16. The second exemplary embodiment performs a control relating to a hold job that designates setting the staple type when the printing is performed, in addition to the control described in the first exemplary embodiment. FIG. 10 and FIG. 16 are flowcharts illustrating the hold job setting change control according to the first exemplary embodiment. To realize each operation (step) of the flowcharts illustrated in FIGS. 10 and 16, the CPU 111 executes the related control program loaded into the RAM 113 from the ROM 112 or the storage 114.

If a user touches the key 715 and the key 716 displayed on the operation unit 116, the CPU 111 executes processing according to the flowchart illustrated in FIG. 10.

In steps S1001 to S1004, the CPU 111 performs processing that is similar to the processing described in the first exemplary embodiment. In step S1004, if the CPU 111 determines that the job includes the designation of the staple settings, the operation proceeds to step S1605 of the flowchart illustrated in FIG. 16. In step S1605, the CPU 111 identifies the staple type designated for the job with reference to the print attribute information. If the CPU 111 determines that the designated type is the "staple binding process" (STAPLE BINDING PROCESS in step S1605), the operation proceeds to step S1012. The CPU 111 performs the processing in step S1012 and subsequent steps. If the CPU 111 determines that the designated type is the "stapleless binding process" (STAPLELESS BINDING PROCESS in step S1605), the operation proceeds to step S1006. The CPU 111 performs the processing in step S1006 and subsequent steps. The processing to be performed in step S1012 and subsequent steps and the processing to be performed in step S1006 and subsequent steps are similar to those described in the first exemplary embodiment and therefore redundant description thereof will be avoided.

On the other hand, if the CPU 111 determines that the designated type is the "set when printing is performed", the operation proceeds to step S1606. In step S1606, the CPU 111 determines whether the number of sheets to be printed when the setting change is applied is equal to or less than the upper-limit number of sheets allowable when the stapleless binding process is performed. If the CPU 111 determines that the number of sheets to be printed is equal to or less than the upper-limit number of sheets (YES in step S1606), the operation proceeds to step S1607. If the CPU 111 determines that the number of sheets to be printed is greater than the upper-limit number of sheets (NO in step S1606), the operation proceeds to step S1610. In step S1610, the CPU 111 sets the staple binding process to valid (ON) and sets the stapleless binding process to invalid (OFF). Then, the operation proceeds to step S1011.

Figure 11C:
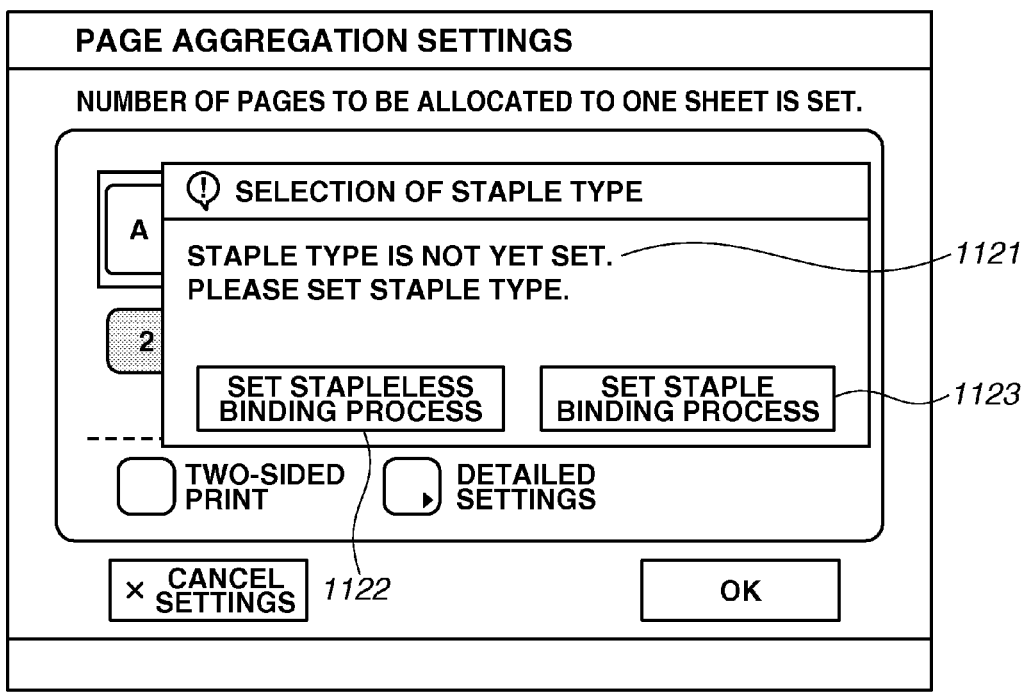

In step S1607, the CPU 111 displays an inquiry screen (e.g., a pop-up screen) to allow a user to select a desired staple type. FIG. 11C illustrates an example of the operation screen that the CPU 111 can display on the panel 201 of the operation unit 116. Information 1121 is notification information that notifies a user that no staple type is set for the job and the staple type can be designated via the inquiry.

A key 1122 is a stapleless setting key that can be used to set the stapleless binding process for the job. A key 1123 is a staple setting key that can be used to set the staple binding process for the job. Referring back to FIG. 16, in step S1608, the CPU 111 accepts a user instruction via the pop-up screen in FIG. 11C. If the CPU 111 determines that the key 1122 has been touched (STAPLELESS BINDING PROCESS in step S1608), the operation proceeds to step S1609. If the CPU 111 determines that the key 1123 has been touched (STAPLE BINDING PROCESS in step S1608), the operation proceeds to step S1610. In step S1609, the CPU 111 sets the stapleless binding process to valid (ON) and sets the staple binding process to invalid (OFF). Then, the operation proceeds to step S1011.

In step S1011, the CPU 111 applies the settings determined through the processing of the flowcharts illustrated in FIGS. 10 and 16. Then, the CPU 11 terminates the processing of the flowcharts illustrated in FIGS. 10 and 16.

Next, a print related control method according to the present exemplary embodiment will be described in detail below. In the present exemplary embodiment, the CPU 111 performs setting change determination even when the key 711 is touched to input a job to the Print queue because of the presence of a hold job for which setting the staple type when printing is performed is designated.

Figure 14:
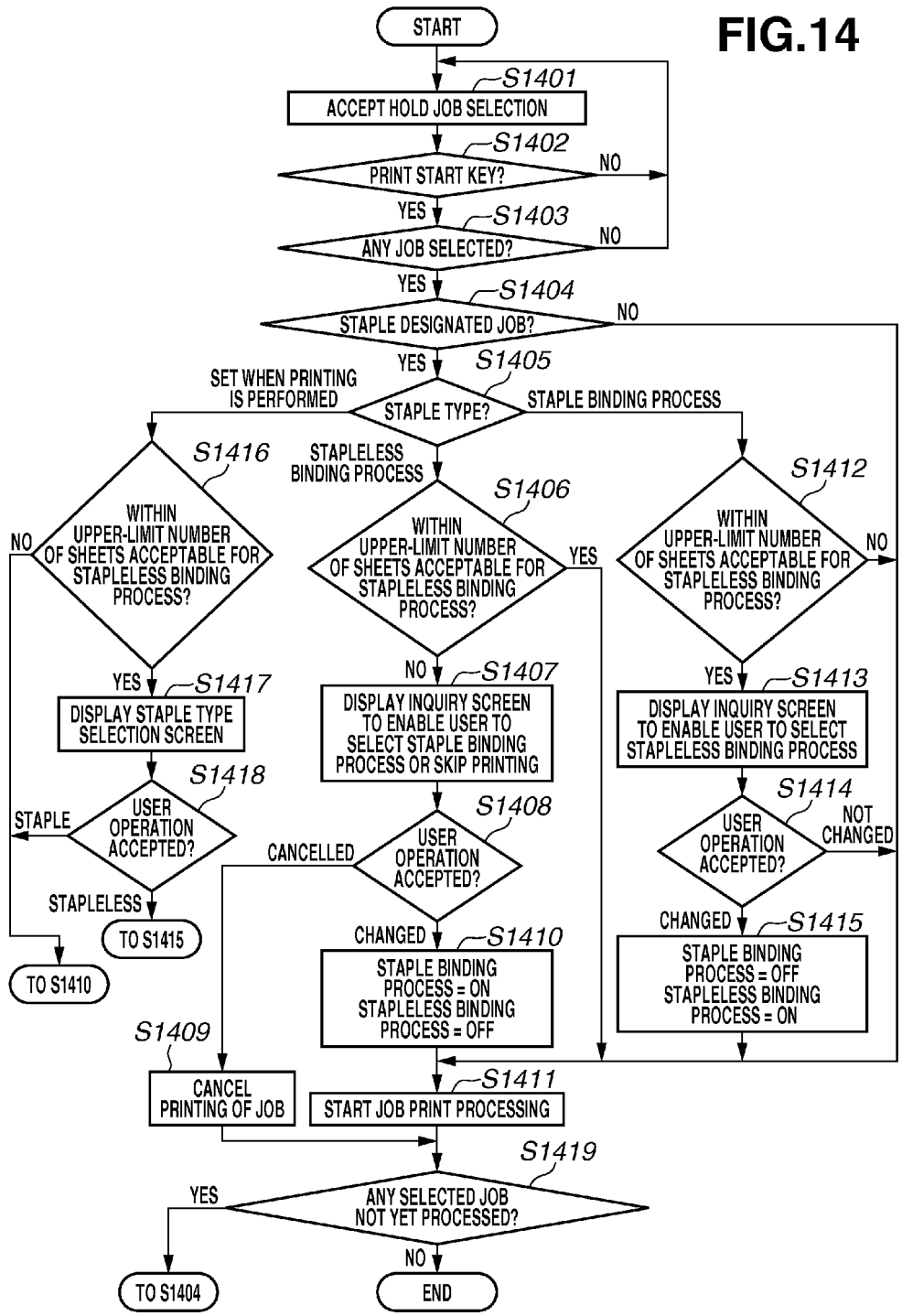
FIG. 14 is a flowchart illustrating a control method relating to print start of a job.

FIG. 14 is a flowchart illustrating a control that can be performed when the CPU 111 performs printing using the job holding function. To realize each operation (step) of the flowchart illustrated in FIG. 14, the CPU 111 executes the related control program loaded into the RAM 113 from the ROM 112 or the storage 114.

In step S1401, the CPU 111 accepts selection of a hold job. Each user can select a job by touching the region 700.

In step S1402, the CPU 111 determines whether the key 711 has been touched. If the CPU 111 determines that the key 711 has been touched (YES in step S1402), the operation proceeds to step S1403. If the CPU 111 determines that the key 711 has not been touched (NO in step S1402), the operation returns to step S1401 to allow the user to select another hold job.

In step S1403, the CPU 111 determines whether there is at least one hold job having been selected. If the CPU 111 determines that at least one hold job has been selected (YES in step S1403), the operation proceeds to step S1404. If the CPU 111 determines that there is not any hold job having been selected (NO in step S1403), the operation returns to step S1401 to wait for the selection of another hold job.

The CPU 111 performs processing in steps S1404 to S1418 for each hold job. If there is a plurality of hold jobs having been selected, the CPU 111 repeats the processing in steps S1404 to S1418 according to the printing order. For example, the example illustrated in FIG. 13 indicates that the CPU 111 performs the above-mentioned processing in the order of "Job A", "Job D", "Job F", and "Job B".

In step S1404, the CPU 111 determines whether there is any binding processing (staple processing) being currently set with reference to the print attribute information about the hold job stored in the RAM 113 or the storage 114 according to the printing order. If the CPU 111 determines that the binding processing is set (YES in step S1404), the operation proceeds to step S1405. If the CPU 111 determines that the binding processing is not set (NO in step S1404), the operation proceeds to step S1411. In step S1411, the CPU 111 converts the hold job into a print job and inputs the print job to the Print queue. The job having been input in the Print queue can be printed on a sheet by the printing unit 120.

On the other hand, in step S1405, the CPU 111 identifies the staple type designated for hold job with reference to the print attribute information. If the CPU 111 determines that the designated type is the "staple binding process" (STAPLE BINDING PROCESS in step S1405), the operation proceeds to step S1412. If the CPU 111 determines that the designated type is the "stapleless binding process" (STAPLELESS BINDING PROCESS in step S1405), the operation proceeds to step S1406. Further, if the CPU 111 determines that the designated type is the "set when printing is performed" (SET WHEN PRINTING IS PERFORMED in step S1405), the operation proceeds to step S1416.

First, a control to be performed when the designated type is the "set when printing is performed" will be described in detail below. In step S1416, similar to the processing in step S1006, the CPU 111 determines whether the number of sheets to be printed is equal to or less than the upper-limit number of sheets allowable when the stapleless binding process is performed. If the CPU 111 determines that the number of sheets to be printed is equal to or less than the upper-limit number of sheets (YES in step S1416), the operation proceeds to step S1417. If the CPU 111 determines that the number of sheets to be printed is greater than the upper-limit number of sheets (NO in step S1416), the operation proceeds to step S1410. In step S1417, the CPU 111 displays an inquiry screen (e.g., a pop-up screen) to inquire about the staple type.

Figure 15A:
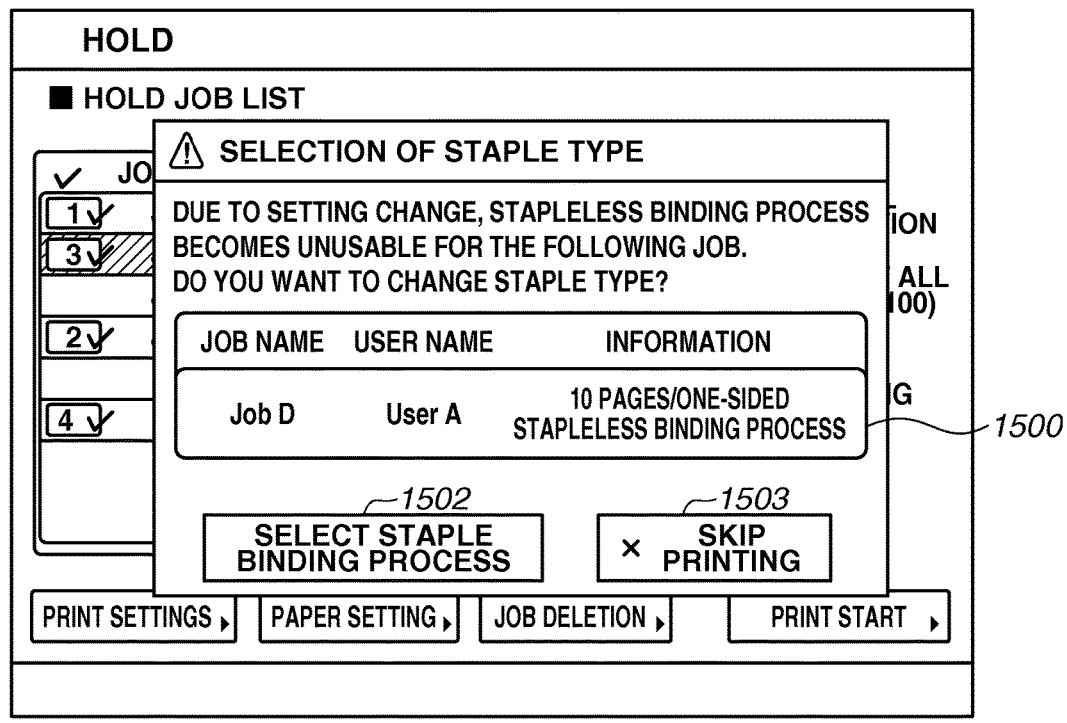
FIGS. 15A, 15B, and 15C illustrate operation screens displayed on the panel 201.
Figure 15B:
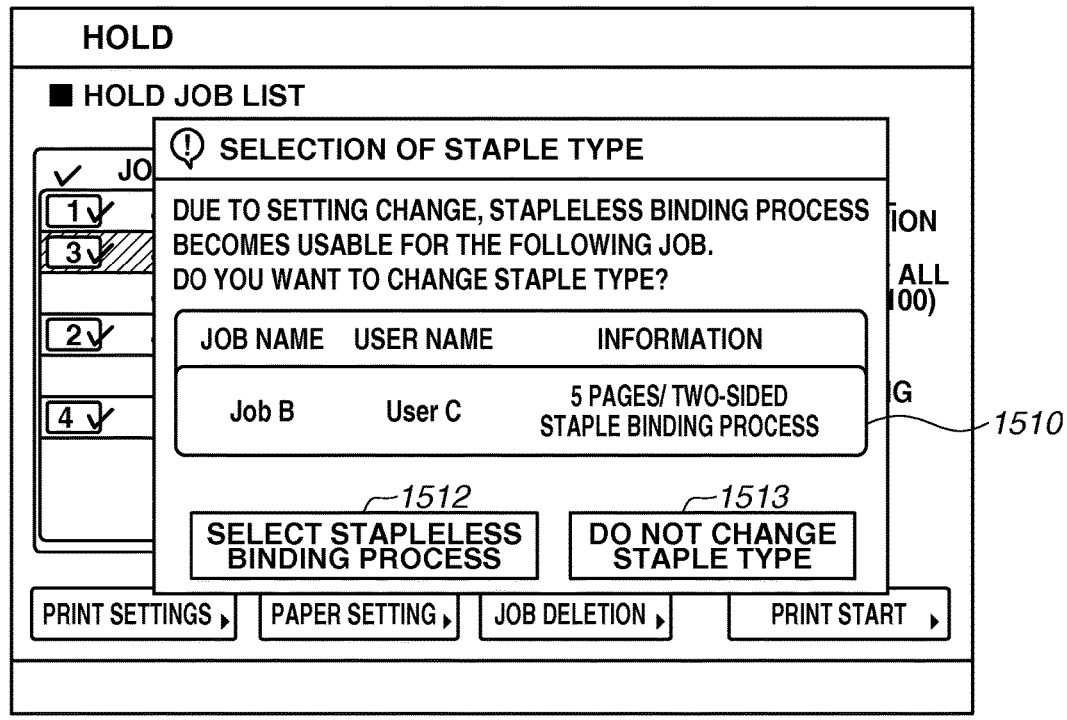
Figure 15C:
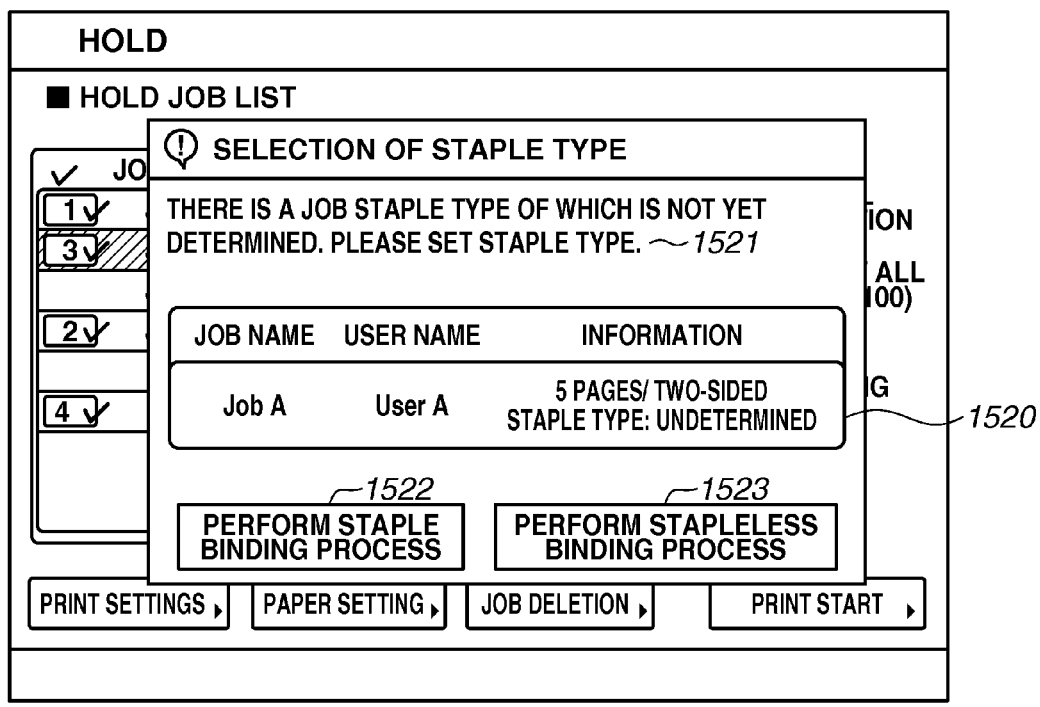

FIG. 15C illustrates an example of the operation screen that the CPU 111 can display on the panel 201 of the operation unit 116. Information 1521 is notification information that notifies a user of the presence of a job for which no staple type is set. Information 1520 notifies a user of job related information. It is useful to display a pop-up screen indicating detailed information when the information 1521 or information 1500 or 1510 described below is touched.

A key 1522 is a staple setting key that can be used to designate the staple binding process as the staple type and start the print. Further, a key 1523 is a stapleless setting key that can be used to designate the stapleless binding process as the staple type and start the print.

Referring back to FIG. 14, in step S1418, the CPU 111 accepts a user instruction via the pop-up screen illustrated in FIG. 15C. If the key 1522 is touched (STAPLE BINDING PROCESS in step S1418), the operation proceeds to step S1410. If the key 1523 is touched (STAPLELESS BINDING PROCESS in step S1418), the operation proceeds to step S1415.

In step S1410, the CPU 111 determines to use the staple binding process for the binding processing, similar to the processing in step S1010 described in the first exemplary embodiment. Further, in step S1415, the CPU 111 determines to use the stapleless binding process for the binding processing, similar to the processing in step S1015 described in the first exemplary embodiment.

Next, a control to be performed when the designated type is the "stapleless binding process" will be described in detail below. In step S1406, similar to the processing in step S1006, the CPU 111 determines whether the number of sheets to be printed is equal to or less than the upper-limit number of sheets allowable when the stapleless binding process is performed. If the CPU 111 determines that the number of sheets to be printed is equal to or less than the upper-limit number of sheets (YES in step S1406), the operation proceeds to step S1411. The CPU 111 starts print processing. If the CPU 111 determines that the number of sheets to be printed is greater than the upper-limit number of sheets (NO in step S1406), the operation proceeds to step S1407. In step S1407, the CPU 111 displays an inquiry screen (e.g., a pop-up screen) that inquires whether the user wants to change the staple type to the staple binding process or skip the print. FIG. 15A illustrates an example of the operation screen that the CPU 111 can display on the panel 201 of the operation unit 116, which corresponds to the screen illustrated in FIG. 11A described in the first exemplary embodiment. The information 1500 is notification information that notifies a user of job information. A key 1502 is a change key that can be used to change the staple type to the staple binding process and start the print. A key 1503 is a skip key that can be used to skip the printing of the job.

Referring back to FIG. 14, in step S1408, the CPU 111 accepts a user instruction via the pop-up screen illustrated in FIG. 15A. If the key 1502 is touched (CHANGED in step S1408), the operation proceeds to step S1410 and subsequent steps. The CPU 111 determines to use the staple binding process for the binding processing and starts printing the job. On the other hand, if the key 1503 is touched (CANCELLED in step S1408), the operation proceeds to step S1409. In step S1409, the CPU 111 cancels the printing of the job. Then, the operation proceeds to step S1419.

Finally, a control to be performed when the designated type is the "staple binding process" will be described in detail below. Processing to be performed in steps S1412 to S1414 is similar to the processing in steps S1012 to S1014 described in the first exemplary embodiment. In step S1412, the CPU 111 determines whether the number of sheets to be printed is equal to or less than the upper-limit number of sheets allowable when the stapleless binding process is performed. If the CPU 111 determines that the number of sheets to be printed is greater than the upper-limit number of sheets (NO in step S1412), the operation proceeds step S1411, and the CPU 111 starts print processing. If the CPU 111 determines that the number of sheets to be printed is equal to or less than the upper-limit number of sheets (YES in step S1412), the operation proceeds to step S1413. In step S1413, the CPU 111 displays an inquiry screen. FIG. 15B illustrates an example of the operation screen that the CPU 111 can display on the panel 201 of the operation unit 116, which corresponds to the screen illustrated in FIG. 11B described in the first exemplary embodiment. The information 1510 is notification information that notifies a user of job information. A key 1512 is a change key that can be used to change the staple type to the stapleless binding process and start the print. A key 1513 is a non-change key that can be used to start the print without cancelling the staple binding process.

Referring back to FIG. 14, in step S1414, the CPU 111 accepts a user instruction via the screen illustrated in FIG. 15B. If the key 1512 is touched (CHANGED in step S1414), the operation proceeds to step S1415. In step S1415 and subsequent steps, the CPU 111 determines to use the stapleless binding process for the binding processing and starts printing the job. On the other hand, if the key 1513 is touched (NOT CHANGED in step S1414), the operation proceeds to step S1411. The CPU 111 starts printing the job without changing the staple processing.

In step S1419, the CPU 111 determines whether there is any job selected in step S1401 and is not yet processed. If the CPU 111 determines that there is not any unprocessed job (NO in step S1419), the CPU 111 terminates the print start control and shifts the operation screen to the main screen illustrated in FIG. 13 that relates to the job holding function. On the other hand, if the CPU 111 determines that there is an unprocessed job (YES in step S1419), the operation returns to step S1404. The CPU 111 performs processing relating to the next hold job according to the printing order.

As mentioned above, in the present exemplary embodiment, in addition to the setting change described in the first exemplary embodiment, it is feasible to set the staple type for a hold job, if the staple type is not yet set, in response to a setting change. Accordingly, it is feasible to set an appropriate type of binding processing based on the changed number of sheets after the setting change. Thus, the setting change excellent in user-friendliness can be realized.

Further, in the present exemplary embodiment, when the MFP 101 starts printing of a selected hold job, the CPU 111 compares the number of sheets to be printed with the upper-limit number of sheets allowable for the stapleless binding process and performs inquiry relating to the staple type. Accordingly, even when the print settings are not changed beforehand for a job for which the staple type is not yet set, it is feasible to set the type of binding processing when printing is performed.

Another Embodiment

Figure 17:
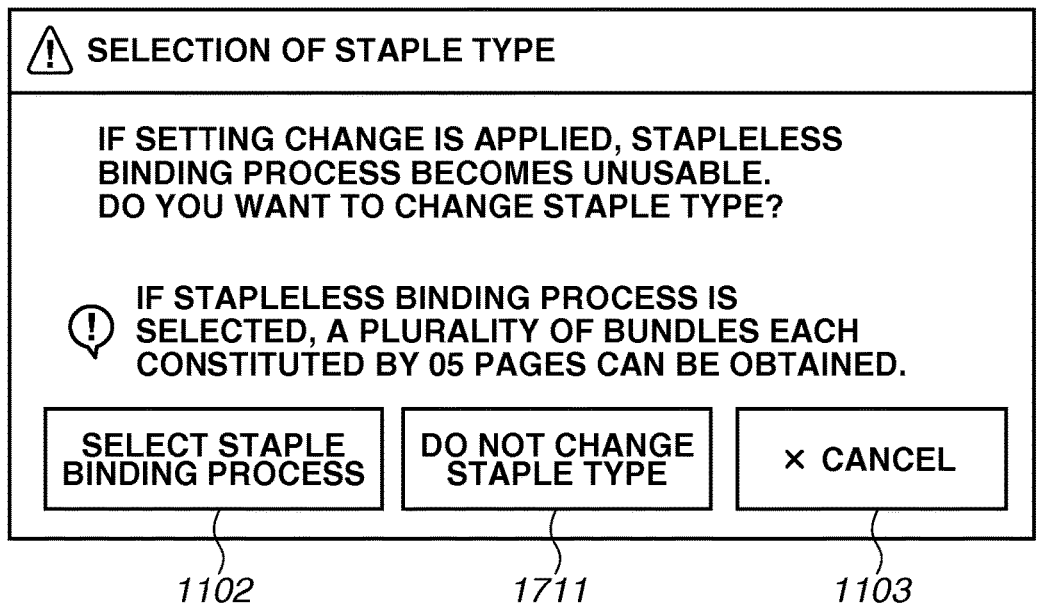
FIG. 17 illustrates an operation screen displayed on the panel.

In the inquiry relating to the staple type selection in the first and second exemplary embodiments, it is useful to provide an additional choice to designate a separated-volume binding without cancelling the stapleless binding process. FIG. 17 is a pop-up screen that allows a user to select the separated-volume binding.

For example, if the CPU 111 determines that a key 1711 has been touched, the CPU 111 turns a separated-volume flag to ON and applies the setting change of the job. The sheet processing unit 122 outputs a printed product as separated volumes appropriately when the separated-volume flag is set to ON for the job. In this case, the staple type can be flexibly set in response to the setting change.

Further, the above-mentioned first and second exemplary embodiments are applicable in a case where a user operates an appropriate print control apparatus, such as a print server (not illustrated), to change a job related setting without operating the MFP 101. In this case, the print control apparatus appropriately acquires the binding processing capability of the MFP 101 and executes the control programs corresponding to the flowcharts illustrated in FIGS. 10, 14, and 16.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although the present invention has been described with reference to the exemplary embodiments, the present invention is not narrowly limited to specific exemplary embodiments and can be modified in various ways within the scope of the present invention defined by the following claims.

The present invention intends to provide a mechanism capable of easily setting an appropriate type of binding processing according to a setting change of a hold job.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-246329, filed Dec. 4, 2014, which is hereby incorporated by reference herein in its entirety.

What is claimed is:

1. A print control apparatus that controls a print operation based on a print job, the apparatus comprising:
a processor; and
a memory storing instructions which, when executed by the processor, cause the print control apparatus to:
accept a setting change of a print job selected by a user from among stored print jobs,
in a case where the print job becomes a print job in which a number of sheets to be used for the print job does not exceed a number of sheets allowable for a first binding processing for binding sheets without using any staple and a second binding processing for binding sheets with a staple is set by reflecting the setting change, perform an inquiry to inquire whether a user wants to perform the first binding processing and reflect the setting change of the print job based on a user instruction received in response to the inquiry, and
in a case where the print job becomes a print job in which the number of sheets to be used for the print job exceeds the number of sheets allowable for the first binding processing and the second binding processing is set by reflecting the setting change, reflect the setting change of the print job without performing the inquiry.

2. The print control apparatus according to claim 1, wherein, when the processor executes the instructions, the print control apparatus further functions;
in a case where the print job becomes a print job in which first binding processing is set and the number of sheets to be used for the print job exceeds the number of sheets allowable for the first binding processing by reflecting the setting change, perform a second inquiry to inquire whether a user wants to perform second binding processing and reflect the setting change of the print job based on a user instruction received in response to the second inquiry, and
in a case where the print job becomes a job in which the first binding processing is set and the number of sheets to be used for the print job does not exceed the number of sheets allowable for the first binding processing by reflecting the setting change accepted by the accepting unit, reflect the setting change of the print job without performing the second inquiry.

3. The print control apparatus according to claim 2, wherein, when the processor executes the instructions, the print control apparatus further functions:
in a case where a user instruction to designate the second binding processing is accepted in response to the second inquiry, change a binding processing setting for the print job to the second binding processing and reflect the setting change of the print job, and
in a case where a user instruction to cancel the setting change is accepted in response to the inquiry, discard the setting change of the print job.

4. The print control apparatus according to claim 1, wherein, when the processor executes the instructions, the print control apparatus further functions to:
in a case where a user instruction to designate the first binding processing is accepted in response to the inquiry, change the binding processing setting for the print job to the first binding processing and reflect the setting change of the print job, and
in a case where a user instruction to designate that does not change the binding processing is accepted in response to the inquiry, reflect the setting change of the print job without changing the binding processing setting for the print job.

5. The print control apparatus according to claim 1, wherein, when the processor executes the instructions, the print control apparatus further functions to:
in a case where the print job becomes a print job in which setting the type of the binding processing when printing is performed is set and the number of sheets to be used for the print job does not exceed the number of sheets allowable for the first binding processing by reflecting the setting change accepted by the accepting unit, allow a user to select a desired type of the binding processing, set the selected binding type as a binding processing setting for the print job, and reflect the setting change of the print job, and
in a case where the print job in which setting the type of the binding processing when printing is performed is set and the number of sheets to be used for the print job exceeds the number of sheets allowable for the first binding processing, change a binding processing setting for the print job to the second binding processing and reflect the setting change of the print job.

6. The print control apparatus according to claim 1, wherein the number of sheets allowable for the first binding processing is differentiated for each sheet type used in the print.

7. The print control apparatus according to claim 1, further comprising:
   a printing unit configured to print an image on a sheet based on a print job; and
   a sheet binding unit configured to perform either the first binding processing or the second binding processing.

8. A control method for a print control apparatus for controlling a print operation based on a print job, the method comprising:
   accepting a setting change of a print job selected by a user from among stored print jobs;
   inquiring, in a case where the print job becomes a print job in which a number of sheets to be used for the print job does not exceed a number of sheets allowable for a first binding processing for binding sheets without using any staple and a second binding processing for binding sheets with a staple is set by reflecting the setting change, whether a user wants to perform the first binding processing and reflecting the setting change of the print job based on a user instruction received in response to the inquiry, and
   reflecting, in a case where the print job becomes a print job in which the number of sheets to be used for the print job exceeds the number of sheets allowable for the first binding processing and the second binding processing is set by reflecting the setting change, the setting change of the print job without performing the inquiry.

9. A non-transitory computer-readable storage medium storing a computer-executable program for causing a computer to execute a process for controlling a print control apparatus that controls a print operation based on a print job, the process comprising:
   accepting a setting change of a print job selected by a user from among stored print jobs;
   inquiring, in a case where the print job becomes a print job in which a number of sheets to be used for the print job does not exceed a number of sheets allowable for a first binding processing for binding sheets without using any staple and a second binding processing for binding sheets with a staple is set by reflecting the setting change, whether a user wants to perform the first binding processing and reflecting the setting change of the print job based on a user instruction received in response to the inquiry, and
   reflecting, in a case where the print job becomes a print job in which the number of sheets to be used for the print job exceeds the number of sheets allowable for the first binding processing and the second binding processing is set by reflecting the setting change, the setting change of the print job without performing the inquiry.

* * * * *